United States Patent [19]

Ikegami

[11] Patent Number: 5,465,815
[45] Date of Patent: Nov. 14, 1995

[54] MAGNETIC BRAKE

[76] Inventor: Iwao Ikegami, 1421-223, Nanjo, Nirayama-cho, Tagata-gun, Shizuoka-ken 410-21, Japan

[21] Appl. No.: 179,136

[22] Filed: Jan. 10, 1994

[51] Int. Cl.⁶ ....................................... H02K 1/06
[52] U.S. Cl. ................................. 188/164; 310/93
[58] Field of Search ........................ 188/164, 30, 82.1, 188/161–163, 165; 310/93, 105

[56] References Cited

U.S. PATENT DOCUMENTS

| | | | |
|---|---|---|---|
| 3,488,535 | 1/1970 | Baermann | 310/93 |
| 4,482,034 | 11/1984 | Baermann | 188/165 |
| 5,215,169 | 6/1993 | Kuwahara | 188/164 |
| 5,248,133 | 9/1993 | Okamoto et al. | 188/161 |
| 5,303,802 | 4/1994 | Kuwahara | 188/164 X |

Primary Examiner—Robert J. Oberleitner
Assistant Examiner—Alfred Muratori
Attorney, Agent, or Firm—Oliff & Berridge

[57] ABSTRACT

A brake apparatus applies a braking force from a stationary member to a moving member adapted to move relative to the stationary member. Magnets are arranged on the stationary member along the linear motion or rotational direction of the moving member and magnets are arranged on the moving member so that the stationary side magnets face the moving side magnets. When magnetic attractive/repulsive forces between the magnets on the moving and stationary members act in a direction to accelerate the moving member, the magnets on either one side are allowed to escape in the same direction. When magnetic attractive/repulsive forces act in a direction to decelerate the moving member, the magnets are restrained from movement in the same direction. This brake avoids any temperature rise due to local heat generation during braking.

15 Claims, 15 Drawing Sheets

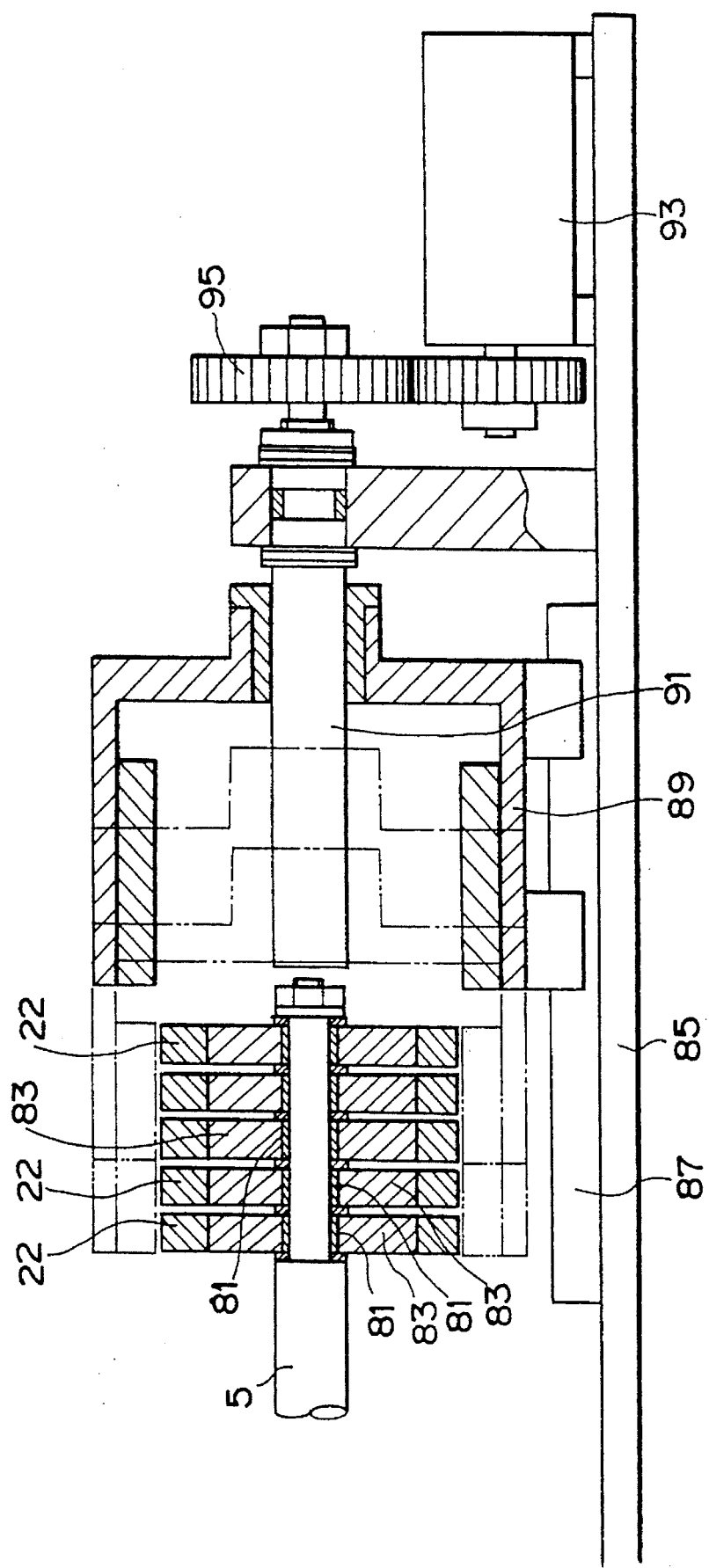

MAGNETIC BRAKE

BACKGROUND OF THE INVENTION

Field of the Invention

This invention relates to a brake apparatus used in various vehicles, cargo machines such as cranes, and various other machinery instruments for decelerating or stopping a moving member or suppressing excessive acceleration thereof.

Prior Art

Current commonly used brake apparatus include a moving member, a stationary member, and a hydraulic or electromagnetic means for pressing a brake member (e.g., brake pad) from the stationary member to a part (e.g., brake shoe) of the moving member whereby mechanical friction or sliding resistance exerts a braking force to the moving member. Brake apparatus utilizing the viscosity resistance of fluid are also used in some applications. Also known are brake apparatus of the power generator type using electromagnets. In addition, brake apparatus using permanent magnets instead of electromagnets are known as retarders which are used as subordinate brake apparatus in large size automobiles such as buses and trailers. In the last mentioned apparatus, a permanent magnet generates a magnetic flux across which a rotor made of conductor extends whereby eddy current is Generated, thereby applying to the rotor an electromagnetic resistance force against its rotational direction.

The above-mentioned brake apparatus relying on mechanical friction have the problem that the frictional members and the surrounding components must be heat resistant because upon braking, the kinetic energy the moving member possesses is converted into heat energy locally at frictional areas to invite a local temperature rise. Wear of the frictional members due to friction is also a problem. Thermal influence is sometimes exerted to the surrounding equipment. In the brake apparatus utilizing the viscosity resistance of fluid, the kinetic energy the moving member possesses is converted into heat energy which appears as a temperature rise of the fluid. At the elevated temperature, the fluid lowers its viscosity resistance to reduce the braking force. To avoid this inconvenience, an extra device for circulating or cooling the fluid is necessary. The brake apparatus of the power generator type using electromagnetic force and the brake apparatus using permanent magnets as retarders allow for generation of induction current which is converted into heat energy through Joule effect to invite a local temperature rise at the rotor or the like. Then a cooling device or heat dissipating fins must be added.

SUMMARY OF THE INVENTION

Therefore, an object of the present invention is to provide a novel and improved brake apparatus which avoids local temperature rise, allows for use of less heat resistant parts, and eliminates a need for cooling.

The present invention relates to a brake apparatus including a stationary member and a moving member adapted to move along a predetermined motion orbit relative to the stationary member. The brake apparatus applies a braking force from the stationary member to the moving member. The stationary member carries thereon a row of at least one magnet, which may be either a permanent magnet or an electromagnet, such that a plurality of magnetic poles are arranged along the orbit of the moving member. The moving member carries thereon a row of at least one permanent magnet such that a plurality of magnetic poles are arranged along the orbit of the moving member and such that the plurality of magnetic poles are opposed to the magnetic poles of the magnet row on the stationary member when the moving member moves. At least one magnet row of the magnet row on the stationary member and the magnet row on the moving member, on its side facing the other magnet row, has magnetic poles of opposite sign alternately arranged in the direction of the orbit. Either one magnet row of the magnet row on the stationary member and the magnet row on the moving member is fixedly secured to the member carrying it. The other magnet row or each magnet therein is coupled to the member carrying it through an intermediate holding means or selective interlocking means. When a magnetic attractive force and a magnetic repulsive force between the magnetic poles of the other magnet row and the magnetic poles of the one magnet row acts in a direction to accelerate motion of the moving member, the other magnet row or each magnet is allowed for movement relative to the member carrying it in a direction including the direction of the magnetic attractive force and magnetic repulsive force acting. When a magnetic attractive force and a magnetic repulsive force between the magnetic poles of the other magnet row and the magnetic poles of the one magnet row acts in a direction to decelerate motion of the moving member, the other magnet row or each magnet is restrained from movement relative to the member carrying it in a direction including the direction of the magnetic attractive force and magnetic repulsive force acting.

Preferably, the selective interlocking means includes a unidirectional motion transmitting mechanism interposed between the other magnet row and the member carrying it.

Preferably, the selective interlocking means has each magnet of the other magnet row held such that each magnet is individually movable and includes a restraint edge for restraining movement of each magnet such that each magnet cannot move beyond a predetermined position.

ADVANTAGES

For ease of understanding, it is assumed, apart from the present invention, that the magnet row on the moving member side (often referred to as a moving side magnet row) is fixedly secured to the moving member and the magnet row on the stationary member side (often referred to as a stationary side magnet row) is fixedly secured to the stationary member.

At least one row of the moving side magnet row and the stationary side magnet row is such that magnetic poles of opposite sign in one magnet row are alternately arranged on the side facing the other magnet row and in the direction of the motion orbit. When the moving member moves along the orbit, the respective magnetic poles in the moving side magnet row come in facing relationship or alignment with the respective magnetic poles in the stationary side magnet row sequentially one by one. During this process, between the respective magnetic poles in the moving side magnet row and the respective magnetic poles in the stationary side magnet row, a state of magnetic poles of same sign facing each other and a state of magnetic poles of opposite sign facing each other occur alternately.

When the moving member moves forward in the moving direction from the state that the moving and stationary side magnets face each other between magnetic poles of opposite sign, the magnetic poles of one sign on the moving member side are moved apart from the magnetic poles of other sign on the stationary member side. At this point, magnetic attractive forces between these magnetic poles of opposite sign act in a direction to prevent movement of the moving member, that is, in a direction to decelerate the moving member. Next comes a state that the moving and stationary side magnets face each other between magnetic poles of identical sign. Immediately before this state, the magnetic poles on the moving member side approach the magnetic poles of the same sign on the stationary member side and magnetic repulsive forces therebetween act in a direction to prevent movement of the moving member, that is, in a direction to decelerate the moving member. After the moving and stationary side magnets have faced each other between magnetic poles of identical sign, another situation follows. As the moving member moves further forward in the moving direction, the magnetic poles of identical sign are moved apart, and magnetic repulsive forces therebetween act in a direction to accelerate movement of the moving member. Next comes a state that the moving and stationary side magnets face each other between magnetic poles of opposite sign. Immediately before this state, the magnetic poles of one sign on the moving member side approach the magnetic poles of other sign on the stationary member side and magnetic attractive forces therebetween act in a direction to accelerate the moving member.

Ultimately, magnetic attractive/repulsive forces act in a direction to decelerate the moving member while the moving member moves from the state that the moving and stationary side magnets face each other between magnetic poles of opposite sign to the state that the moving and stationary side magnets face each other between magnetic poles of identical sign. And magnetic attractive/repulsive forces act in a direction to accelerate the moving member while the moving member moves from the state that the moving and stationary side magnets face each other between magnetic poles of identical sign to the state that the moving and stationary side magnets face each other between magnetic poles of opposite sign. Therefore, as the moving member moves forward, the state that magnetic attractive/repulsive forces between the magnetic poles on the moving member side and the magnetic poles on the stationary member side act in a direction to accelerate the moving member and the state that magnetic attractive/repulsive forces act in a direction to decelerate the moving member occur alternately. In this case, the moving member is once decelerated and immediately thereafter accelerated. The overall process results in no braking force acting on the moving member in total.

In contrast, the brake apparatus of the present invention is constructed such that among the moving side magnet row and the stationary side magnet row, either one magnet row is fixedly secured to the member carrying it (the moving or stationary member), and the other magnet row is held to the member carrying it (the stationary or moving member) via a selective interlocking means which selectively allows or restrains movement of the same member. The selective interlocking means does not allow magnetic attractive/repulsive forces to act in a direction to accelerate the moving member, but allows magnetic attractive/repulsive forces to act only in a direction to decelerate the moving member, thereby applying braking force to the moving member.

Namely, the selective interlocking or intermediate holding means holds the other magnet row or magnets therein such that when magnetic attractive/repulsive forces between the magnetic poles of the other magnet row and the magnetic poles of the one magnet row acts in a direction to accelerate motion of the moving member, the other magnet row or magnets therein is allowed for movement relative to the member carrying it in a direction including the direction of the magnetic attractive/repulsive forces acting. Then in this state, the other magnet row or magnets therein makes relative movement due to tile magnetic attractive/repulsive forces to thereby absorb the forces. As a result, it is avoided that the moving member is accelerated by the magnetic attractive/repulsive forces. Also the selective interlocking means holds the other magnet row or magnets therein such that when magnetic attractive/repulsive forces between the magnetic poles of the other magnet row and the magnetic poles of the one magnet row acts in a direction to decelerate motion of the moving member, the other magnet row or magnets therein is restrained from movement relative to the member carrying it in a direction including the direction of the magnetic attractive/repulsive forces acting. Then in this state, the magnetic attractive/repulsive forces are transmitted to the moving member as a decelerating force through the other magnet row or magnets therein, thereby applying brake to the moving member.

In this way, braking force is applied to the moving member by the magnetic attractive/repulsive forces between magnets. The braking force is analyzed from the standpoint of energy. When the moving member is braked by the magnetic attractive/repulsive forces, it is considered that magnets on the moving member side make non-elastic collision against magnets on the stationary member side. On braking, the kinetic energy of the moving member is converted into potential energy whereby the moving member is braked while the thus accumulated potential energy is dissipated as molecular energy through internal deformation on the stationary member side caused by the non-elastic collision. At this point, at least a portion of the molecular energy is dissipated as heat energy. Since the molecular energy is created as internal energy in the interior of the stationary side magnets, stationary member holding the magnets, and members supporting the stationary member, this heat energy on release is spread over a very wide area or many components. Then the quantity of heat energy generated per unit area is small enough to minimize the risk of local temperature rise. As opposed to conventional brakes of the friction type wherein heat is locally generated at frictional portions which become hot, the present invention eliminates the risk of heating the components hot by local temperature rise.

BRIEF DESCRIPTION OF THE DRAWINGS

FIG. 20 is a partially cut-away front elevation of a brake according to a further embodiment of the invention.

DETAILED DESCRIPTION OF THE INVENTION

Figure 1:
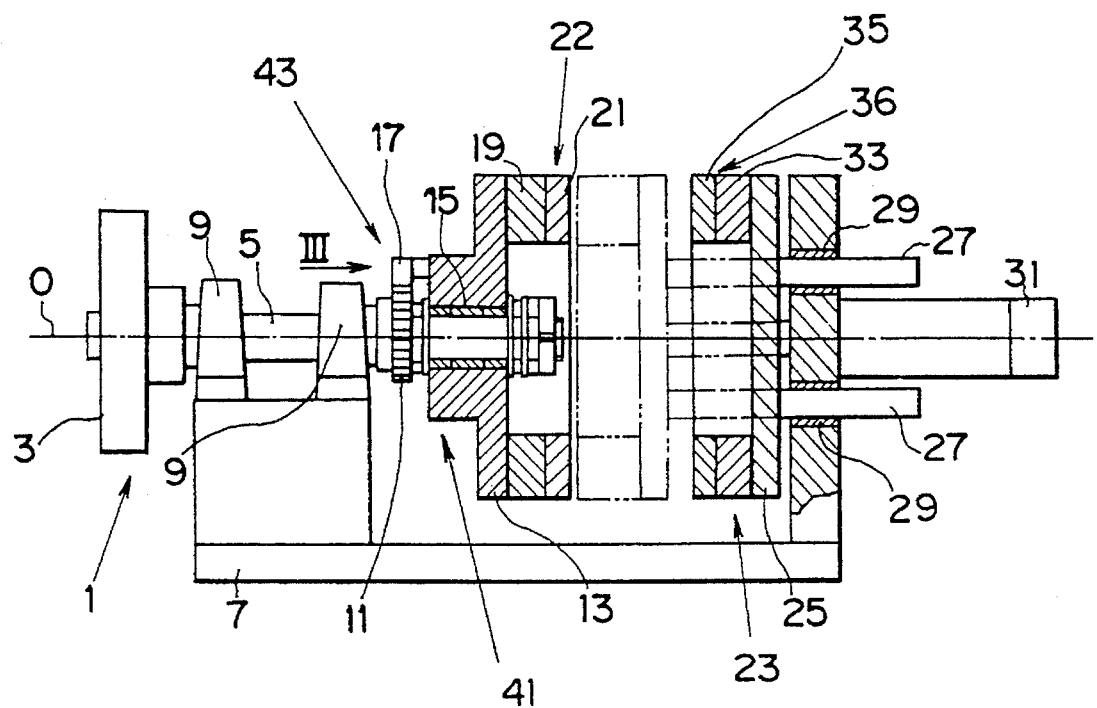
FIG. 1 is a partially cut-away front elevation of a brake according to one embodiment of the invention.

Referring to FIGS. 1 to 4E, there is schematically illustrated one embodiment of the brake apparatus according to the present invention wherein the motion of the moving member is rotation and the selective interlocking means includes a unidirectional motion transmitting mechanism.

The brake apparatus shown in FIGS. 1 to 4 includes a moving member or rotor 1 and a stationary member 23. The rotor 1 includes a rotating member 3 mounted on a rotating shaft 5 which is supported for rotation by a frame 7 via bearings 9. The rotating member 3 is a subject to be braked, for example, a wheel or axle of various vehicles or a roller of various apparatus and installations (e.g., a roller for feeding wire, rod or sheet material).

Secured to the rotating shaft 5 is a ratchet 11. On the rotating shaft 5 in proximity to the ratchet 11, an interlocking rotary wheel 13 is mounted via a bearing 15 for rotation relative to the rotating shaft 5. The interlocking wheel 13 has a ratchet pawl 17 protruding from one side thereof and adapted to engage with the ratchet 11. A row 22 of permanent magnets 21 is carried on the other side of the interlocking wheel 13 through a yoke 19 of a magnetic material. As shown in FIG. 2, this permanent magnet row 22 (to be referred to as a moving side permanent magnet row, hereinafter) includes a plurality of permanent magnets 21 which are disposed at an equal angle circumferentially about the rotational center axis O of the rotating shaft 5 (or the interlocking wheel 13) in an annular array such that N and S poles are alternately arranged. Opposed to the moving side permanent magnet row 22 on the interlocking wheel 13 is a translatable disk or carriage 25 forming a part of the stationary member 23. The disk 25 has a diameter approximately equal to that of the interlocking wheel 13. The translatable disk 25 has a plurality of slide shafts 27 extending outward (rightward in FIG. 1) and parallel to the rotational axis O of the rotating shaft 5. The slide shafts 27 are extended through support rings 29 in the frame 7 for sliding motion. A drive mechanism 31 in the form of a hydraulic cylinder, for example, is attached to the frame 7 and coupled to the central slide shaft 27. The disk 25 is translated toward and away from the interlocking wheel 13 by means of the drive mechanism 31. A row 36 of permanent magnets 35 is carried on the translatable disk 25 through a yoke 33 of a magnetic material so that the row 36 faces the moving side permanent magnet row 22. Like the moving side permanent magnet row 22, this permanent magnet row 36 (to be referred to as a stationary side permanent magnet row, hereinafter) includes a plurality of permanent magnets 35 which are disposed at an equal angle circumferentially about the rotational axis O of the rotating shaft 5 in an annular array such that N and S poles are alternately arranged as shown in FIG. 2. Preferably the angle between the adjacent magnetic poles in the moving side permanent magnet row 2 with respect to the rotational axis O is equal to the angle between the adjacent magnetic poles in the stationary side permanent magnet row 36.

Figure 2:
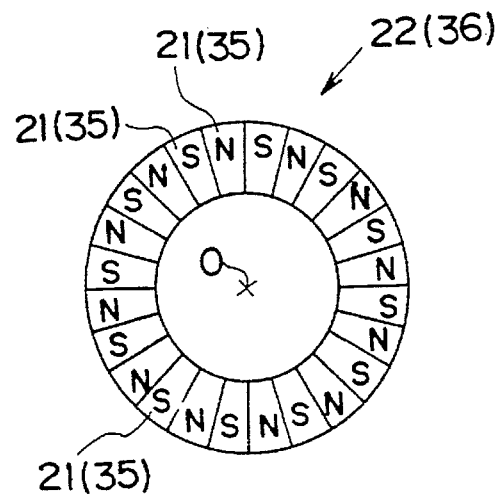
FIG. 2 is a side view of a magnet row on the moving member side and a magnet row on the stationary member side in the brake of FIG. 1.
Figure 3:
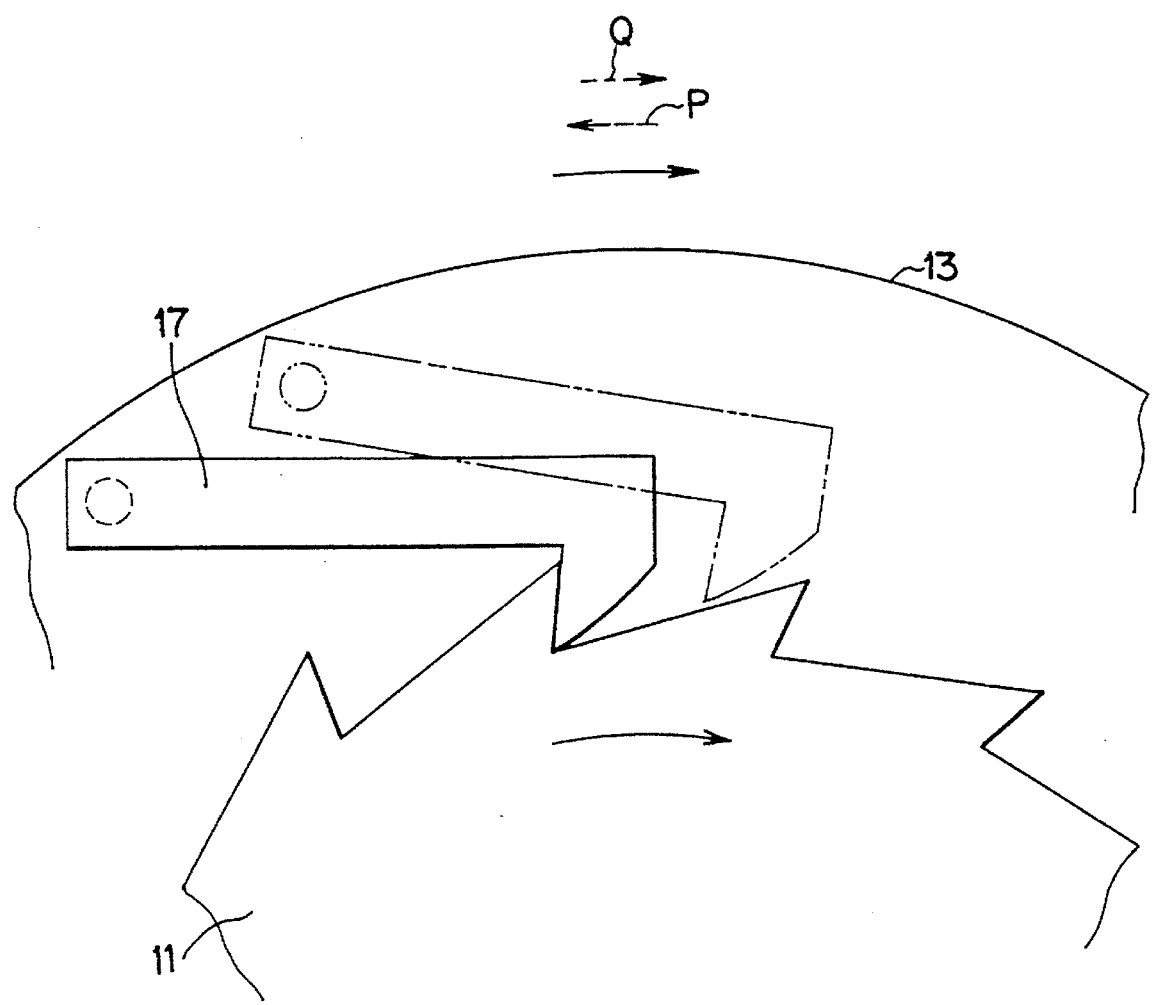
FIG. 3 is an enlarged view looking in the direction of an arrow III in FIG. 1 of a ratchet and a pawl in the brake of FIG. 1.

The operation of the embodiment shown in FIGS. 1 and 2 is described with reference to FIGS. 3 and 4E. It is assumed that the rotating element 3 rotates in a direction shown by solid arrows in FIGS. 3 and 4E.

First assume the state that the translatable disk 25 on the stationary side is retracted as shown by solid lines in FIG. 1, that is, the stationary side permanent magnet row 36 is spaced apart from the moving side permanent magnet row 22. Since no or little magnetic force interacts between these rows, no or little braking force is applied against rotation of the rotating member 3, allowing free rotation of the rotating member 3.

Next, the drive mechanism 31 is actuated to move the translatable disk 25 forward to place the stationary side permanent magnet row 36 in the vicinity of the moving side permanent magnet row 22 to provide magnetic interaction therebetween as shown in phantom lines in FIG. 1. As shown in FIGS. 4A to 4E, as the rotating member 3 or moving side permanent magnet row 22 rotates, there alternately occur an attractive state that the respective magnetic poles of one sign in the moving side permanent magnet row 22 are aligned with the magnetic poles of reverse sign in the stationary side permanent magnet row 36 and a repulsive state that the respective magnetic poles of one sign in the moving side permanent magnet row 22 are aligned with the magnetic poles of the same sign in the stationary side permanent magnet row 36. At a certain instant, the moving side permanent magnet row 22 rotates in the solid line arrow direction from tile state of FIG. 4A that magnetic poles of opposite sign are in alignment to the state of FIG. 4C that magnetic poles of the same sign are in alignment through the state of FIG. 4B. In this process, the N pole of the moving side permanent magnet 21A receives a force opposite to the rotational direction, that is, a decelerating force as shown by broken line arrow P in FIG. 3 and FIG. 4B as a result of a magnetic attractive force from S pole of the stationary side permanent magnet 35A aligned therewith and a magnetic repulsive force to N pole of the adjacent stationary side permanent magnet 35B. The interlocking wheel 13 is thus decelerated against rotation. At this point, the pawl 17 comes in engagement with the ratchet 11 as shown by solid lines in FIG. 3, the ratchet 11 and the rotating member 3 coupled thereto through the rotating shaft 5 are also decelerated. That is, a braking force is applied to the rotating member 3.

Figure 4A:
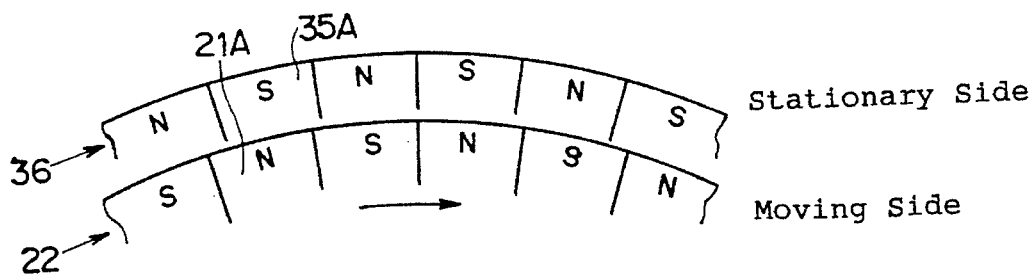
FIGS. 4A–4E schematically illustrates the relationship between the moving and stationary side magnet rows at sequential stages for describing the operation of the brake of FIG. 1.
Figure 4B:
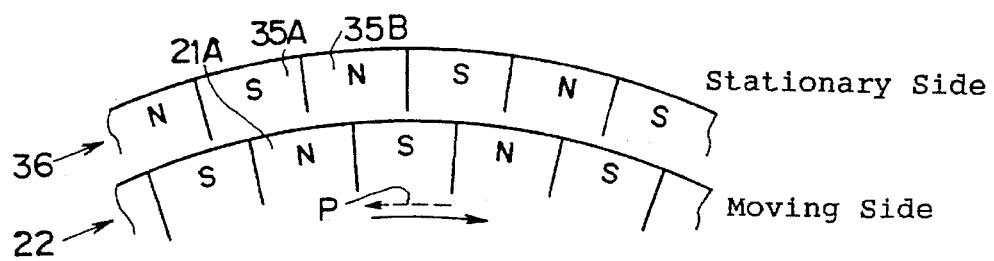
Figure 4C:
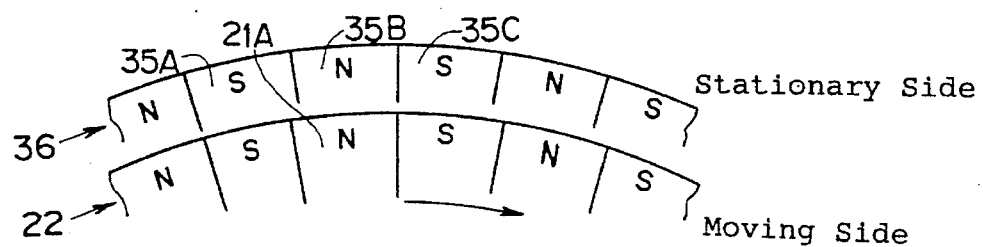
Figure 4D:
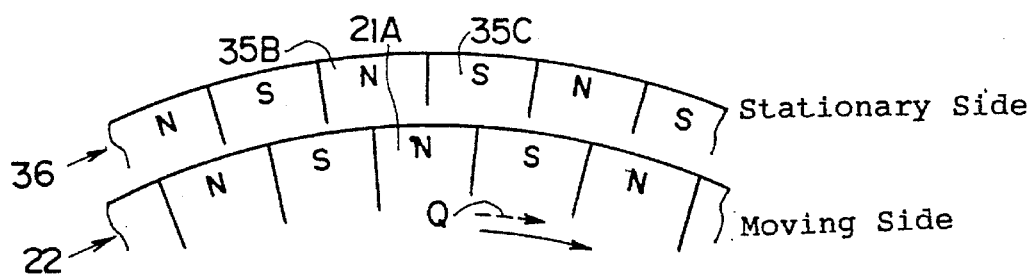
Figure 4E:
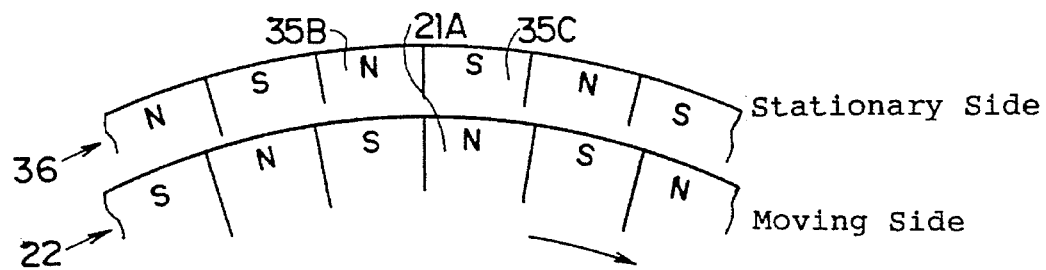

At the next instant, the moving side permanent magnet row 22 rotates in the solid line arrow direction from the state of FIG. 4C that magnetic poles of the same sign are in alignment to the state of FIG. 4E that magnetic poles of opposite sign are in alignment through the state of FIG. 4D. The N pole of the moving side permanent magnet 21A receives a magnetic repulsive force from the N pole of the stationary side permanent magnet 35B and a magnetic attractive force from the S pole of the adjacent stationary side permanent magnet 35C. That is, the N pole of the moving side permanent magnet 21A receives a force in the rotational direction, that is, an accelerating force as shown by a broken line arrow Q in FIG. 3 and FIG. 4D. With this accelerating force, the interlocking wheel 13 is rotated at a higher speed than the rotating member 3. At this point, the ratchet pawl 17 is free from the ratchet 11 as shown by phantom lines in FIG. 3 so that no motion is transmitted and rotation of the rotating member 3 is not accelerated.

At the next instant, the magnetic poles of the moving side permanent magnet raw 22 receive the resultant of magnetic attractive/repulsive forces in a decelerating direction so that rotation of the interlocking wheel 13 is decelerated and the ratchet pawl 17 engages with the ratchet 11, applying a braking force to the rotating member 3.

Thereafter these two states occur alternately. In the embodiment shown in FIGS. 1 to 4E, the unidirectional motion transmitting function of the ratchet 11 and pawl 17 ensures that the resultant of magnetic attractive/repulsive forces between the magnetic poles of the moving and stationary sides is not transmitted to the rotating member when it acts in an accelerating direction, and the resultant is transmitted to the rotating member when it acts in a decelerating direction, applying a braking force to the rotating member 3. Therefore, in this embodiment, the ratchet 11, pawl 17 and interlocking wheel 13 form the selective interlocking means 41 whereas the ratchet 11 and pawl 17 form the unidirectional motion transmitting mechanism 43.

Figure 5:
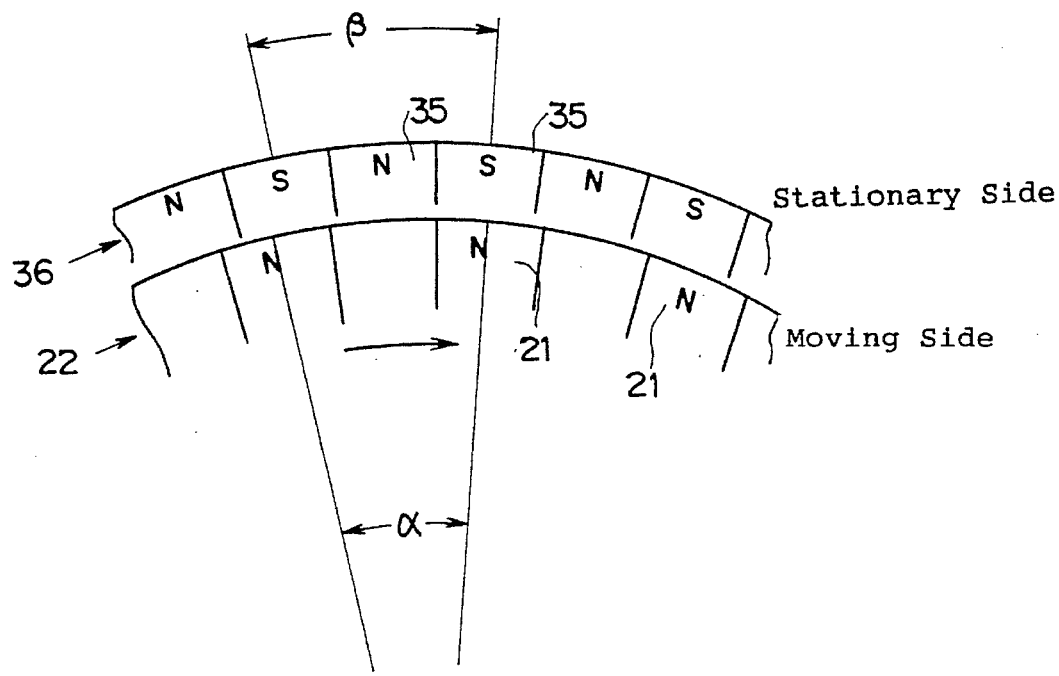
FIG. 5 is a view corresponding to FIG. 4A and illustrating a modification of the embodiment of FIG. 1.

It is to be noted that in the embodiment of FIGS. 1 to 4E, each of the moving side permanent magnet row 22 on the interlocking wheel 13 and the stationary side permanent magnet row 36 on the translatable disk 25 includes magnetic poles of opposite sign alternately arranged in a rotational direction although it is possible that only one permanent magnet row includes alternately arranged magnetic poles of opposite sign and the other permanent magnet row includes an arrangement of magnetic poles of the same sign. One example of this latter embodiment is shown in FIG. 5 in which the stationary side permanent magnet row 36 includes an alternate arrangement of magnetic poles of opposite sign N and S and the moving side permanent magnet row 22 includes an arrangement of magnetic poles of the same sign N. Typically in this embodiment, the angle between the centers of two adjacent magnetic poles associated with the permanent magnet row consisting of an arrangement of same magnetic poles is equal to the angle between the centers of every second magnetic poles associated with the permanent magnet row consisting of an arrangement of opposite magnetic poles. More specifically in the embodiment of FIG. 5, the angle α between the centers of two adjacent magnetic poles N associated with the moving side permanent magnet row 22 is equal to the angle β between the centers of two adjacent S poles (or two adjacent N poles) associated with the stationary side permanent magnet row 36.

Although a ratchet mechanism is used as the unidirectional motion transmitting mechanism in the embodiment of FIGS. 1 to 4E, a unidirectional clutch such as a unidirectional roller clutch may also be used.

Figure 6:
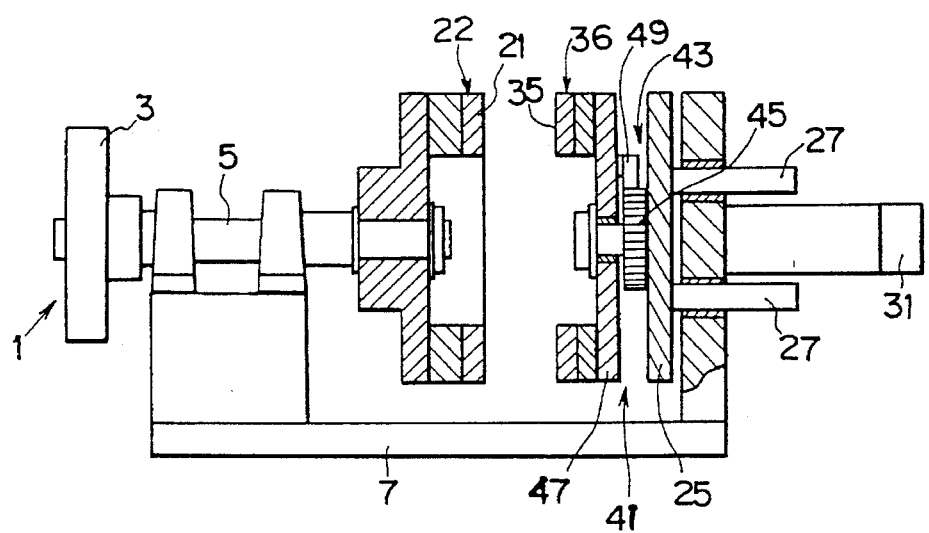
FIG. 6 is a partially cut-away front elevation of a modified brake embodiment similar to FIG. 1, with the unidirectional motion transmitting mechanism attached to the stationary side.

Also in the illustrated embodiment, the unidirectional motion transmitting mechanism is provided on the moving side although it may be provided on the stationary side. This embodiment is shown in FIG. 6 wherein the translatable disk 25 on the stationary side is provided with a ratchet 45. An interlocking rotary disk 47 similar to the interlocking rotary wheel is mounted for rotation to the translatable disk 25. The interlocking disk 47 is provided with a ratchet pawl 49 adapted to engage with the ratchet 45. The stationary side permanent magnet row 36 is fixedly secured to the interlocking disk 47. The moving side permanent magnet row 22 is fixedly secured to a wheel which is fixedly secured to the rotating shaft 5 so that the permanent magnet row 22 always rotates with the rotating member 3.

In this embodiment, the ratchet 45 and pawl 49 are combined for selective engagement to provide a directional function as described below. When the resultant of magnetic attractive/repulsive forces between the magnetic poles of the stationary side permanent magnet row 36 and the magnetic poles of the moving side permanent magnet row 22 acts in a direction to accelerate the moving side, the ratchet 45 and pawl 49 function to allow the stationary side interlocking disk 47 to rotate in the direction of the magnetic attractive/repulsive forces acting that is, in a direction to absorb the accelerating force to the moving side. When the resultant of magnetic attractive/repulsive forces between the magnetic poles of the stationary side permanent magnet row 36 and the magnetic poles of the moving side permanent magnet row 22 acts in a direction to decelerate the moving side, the pawl 49 engages with the ratchet 45 to restrain the interlocking disk 47 from rotating.

FIGS. 7 to 10 illustrate another embodiment of the braking apparatus according to the present invention wherein the moving member 1 makes linear motion and the selective interlocking means 41 has each magnet of the moving side magnet row held such that each magnet is individually movable and includes a restraint edge for restraining movement of each magnet such that each magnet cannot move beyond a predetermined position.

Figure 9:
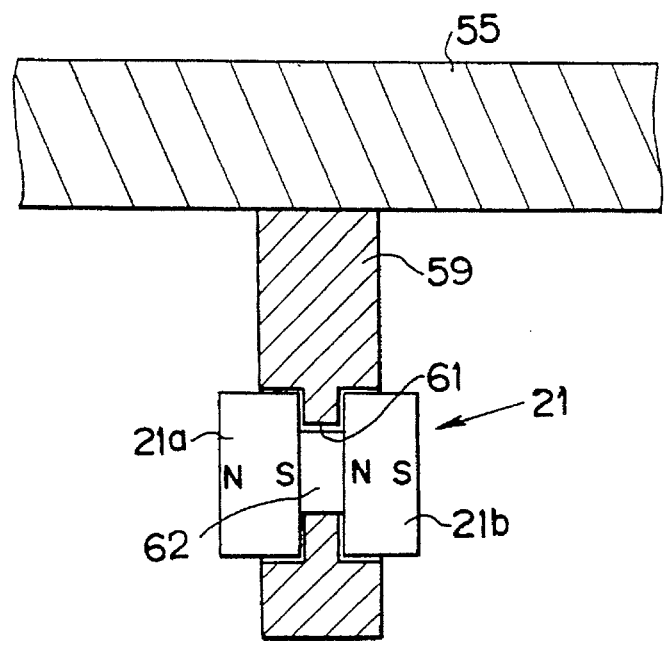
FIG. 9 is an enlarged cross section taken along lines IX—IX in FIG. 7.
Figure 10:
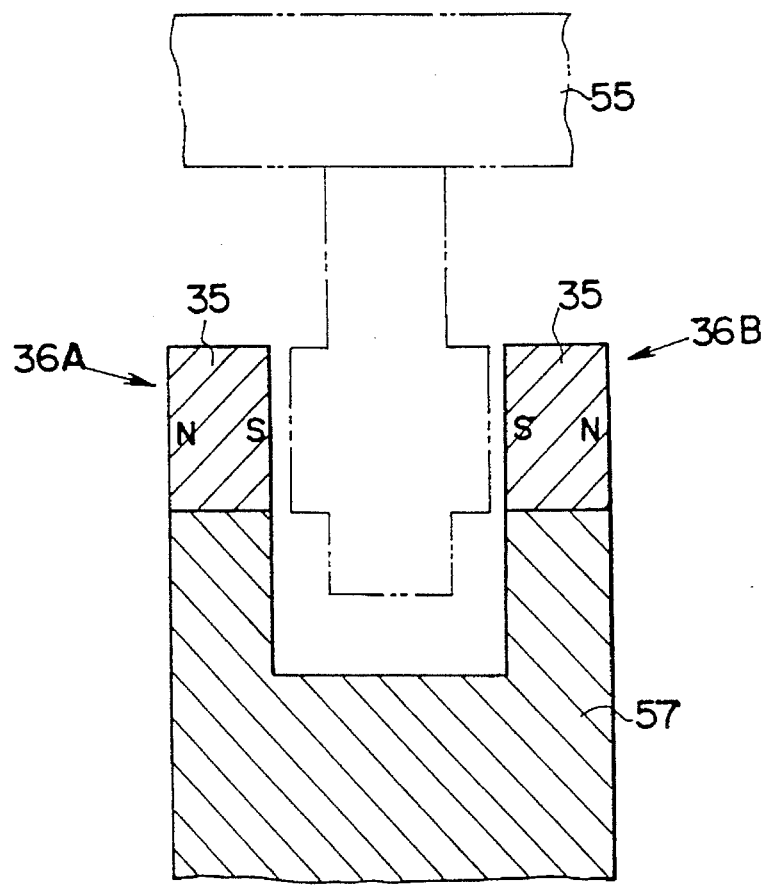
FIG. 10 is an enlarged cross section taken along lines X—X in FIG. 7.

The moving member 1 in this embodiment is a vehicle truck 55 having wheels 53 which travels along a pair of linear rails 51. A stationary member 23 is a longitudinally extending stationary base 57 fixedly disposed at a predetermined position between the pair of rails 51. Two parallel spaced apart rows of permanent magnets 36A and 36B are fixedly secured to the stationary base 57 along the travel direction of the vehicle truck 55. In these stationary side permanent magnet rows 36A and 36B, a plurality of permanent magnets 35 are arranged such that N and S poles in each row are alternately arranged at the inside surface in the longitudinal direction (which is the travel direction of the vehicle truck 55), and the poles of one sign on one side are aligned with the poles of opposite sign on the other side, that is, N and S poles in row 36A are aligned with and opposed to S and N poles in row 36B, respectively. To the lower side of tile vehicle is fixedly secured a frame 59 which can pass between the two stationary side permanent magnet rows 36A and 36B. Since this frame 59 functions as an intermediate carrier means 41 for carrying the moving side row 22 of permanent magnets 21, the permanent magnets 21 are mounted on the frame 59 for limited sliding motion over only a predetermined distance along the travel direction of the truck 55. More particularly, the frame 59 is provided with a plurality of slots 61 along the travel direction of the truck 55. A permanent magnet 21 is fitted in each slot 61 for longitudinal motion. As best shown in FIG. 9, each moving side permanent magnet 21 includes a pair of permanent magnet segments 21a and 21b connected by a yoke 62 of magnetic material such that magnetic poles of opposite sign N and S are positioned at opposed outer sides. In this embodiment, the spacing between the slots 61 is determined such that the distance $L_1$ between the rearward edges 63 of the two adjacent slots which are rearward in the travel direction of the vehicle truck 55 (to be referred to as restraint edges, hereinafter) is four times the distance $L_2$ between the centers of the magnetic poles of two adjacent permanent magnets 35 in the stationary side permanent magnet rows 36A and 36B. In this embodiment, the magnetic pole orientation N-S is identical for all the moving side permanent magnets 21.

The operation of the embodiment of FIGS. 7 to 10 is described with reference to FIGS. 11 and 12C.

Figure 7:
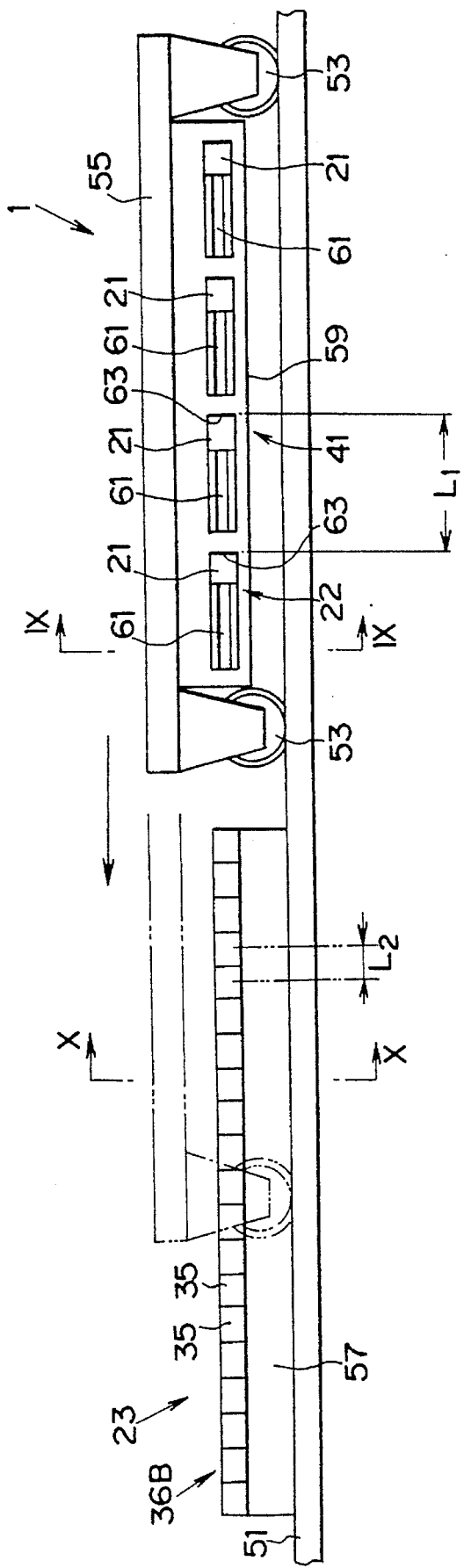
FIG. 7 is a front elevation of a brake according to another embodiment of the invention.
Figure 8:
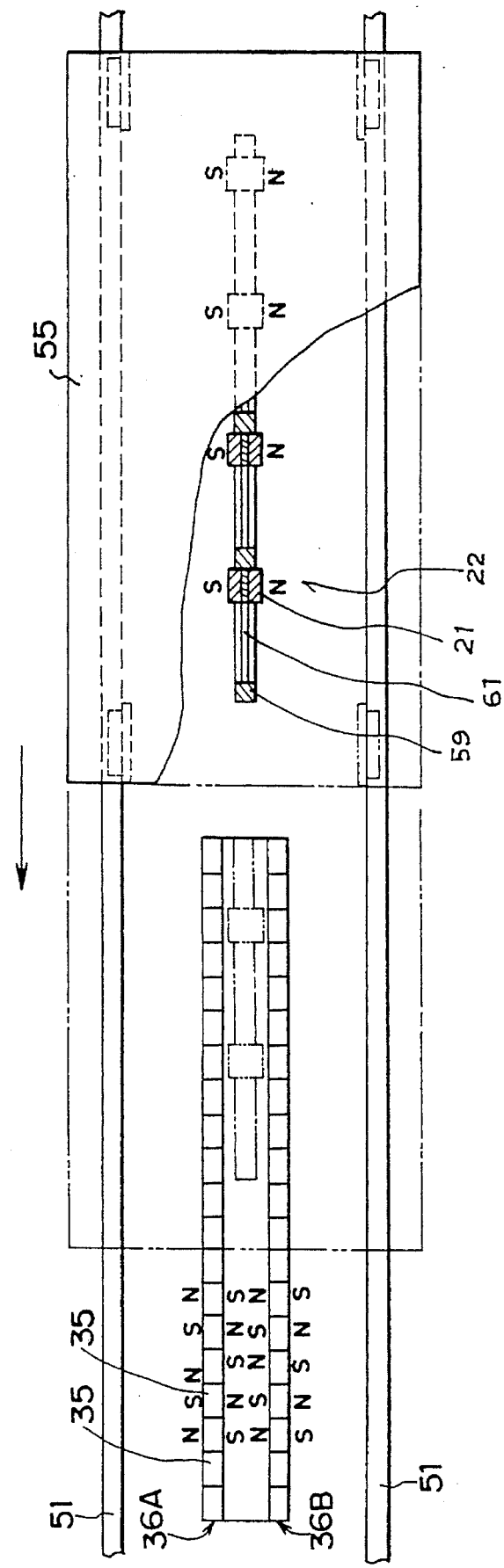
FIG. 8 is a plan view of the brake of FIG. 7.

When the moving side permanent magnet row 22 carried by the frame 59 of the vehicle truck 55 has not reached the position between the permanent magnet rows 36A and 36B of the stationary base 57 as shown in solid lines in FIGS. 7 and 8, no braking force is applied to the truck 55 since no magnetic forces act between the respective magnetic poles of the moving side permanent magnet row 22 and the magnetic poles of the stationary side permanent magnet rows 36.

Figure 11A:
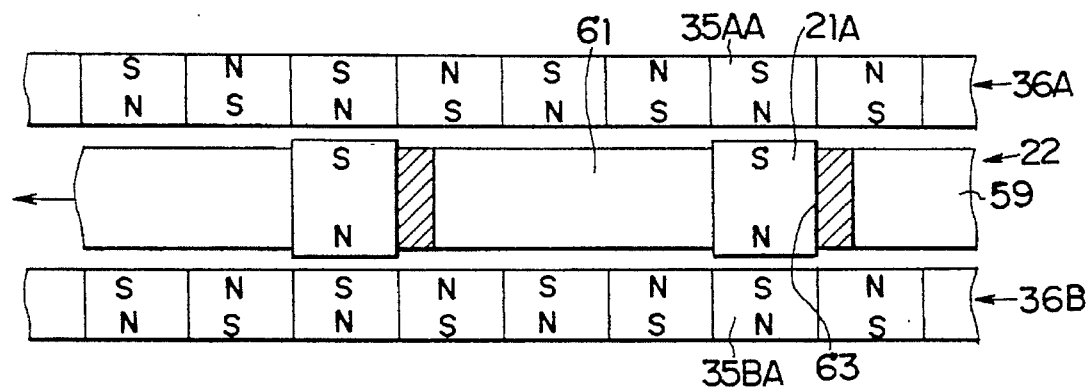
FIGS. 11A–11C schematically illustrates the relationship between the moving and stationary side magnet rows at sequential stages for describing the braking operation of the brake of FIG. 7.

Then the truck 55 moves forward and the moving side permanent magnet row 22 reaches the position between the permanent magnet rows 36A and 36B of the stationary base 57. A braking force is applied to the truck 55 as follows. First, the situation changes from the state that S and N poles of a permanent magnet 21A of the moving side permanent magnet row 22 on opposite sides face the N pole of a permanent magnet 35AA of the stationary side permanent magnet row 36A and the S pole of a permanent magnet 35BA of the stationary side permanent magnet row 36B, respectively, as shown in FIG. 11A (that is, the moving side permanent magnet 21A faces the stationary side permanent magnets 35AA and 35BA each between their magnetic poles of opposite sign) to the state that the S and N poles of the permanent magnet 21A of the moving side permanent magnet row 22 on opposite sides face the S pole of a permanent magnet 35AB of the stationary side permanent magnet row 36A and the N pole of a permanent magnet 35BB of tile stationary side permanent magnet row 36B, respectively, as shown in FIG. 11C (that is, the moving side permanent magnet 21A faces the stationary side permanent magnets 35AB and 35BB each between their magnetic poles of same sign) through the state of FIG. 11B. In this situation, magnetic attractive forces act between the magnetic poles of the moving side permanent magnet 21A and the stationary side permanent magnets 35AA and 35BA, and magnetic repulsive forces act between the magnetic poles of the moving side permanent magnet 21A and the stationary side permanent magnets 35AB and 35BB. These magnetic attractive/repulsive forces cooperatively act in a direction against the forward movement of the truck 55 as shown by a broken line arrow P in FIG. 11B, that is, in a direction to decelerate motion of the truck 55. More particularly, with the forward movement of the truck 55, the restraint edge 63 of the slot 61 in the frame 59 causes the moving side permanent magnet 21A to move forward together with the frame 59 against the magnetic attractive/repulsive forces while the magnetic attractive/repulsive forces act on the frame 59 and hence, the truck 55 as a braking force.

Figure 12A:
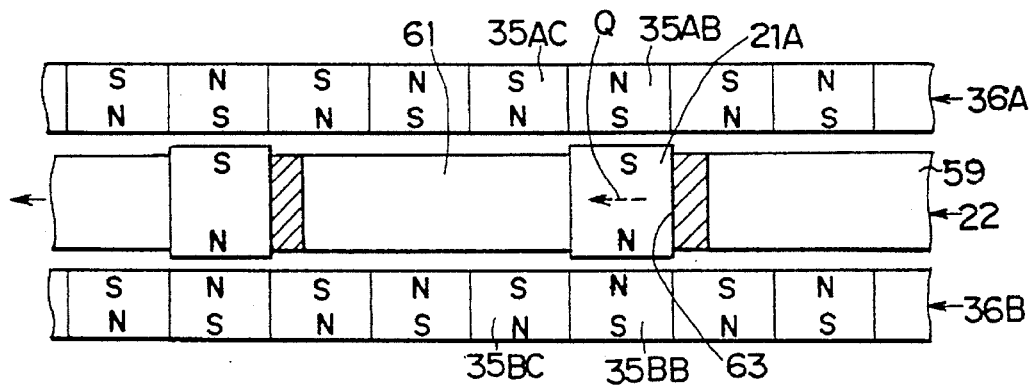
FIGS. 12A–12C schematically illustrates the relationship between the moving and stationary side magnet rows at sequential stages for describing the non-braking operation of the brake of FIG. 7.
Figure 12B:
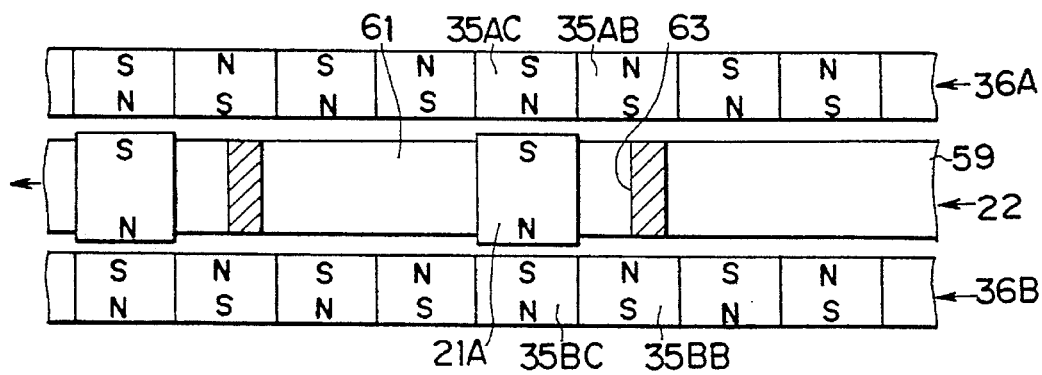
Figure 12C:
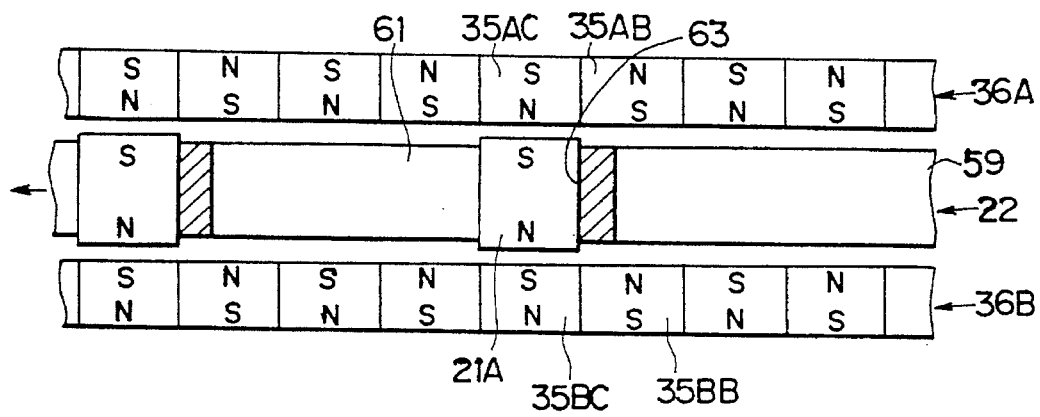

Then the situation changes from the state that the S and N poles of the permanent magnet 21A of the moving side permanent magnet row 22 on opposite sides face the S pole of the permanent magnet 35AB of the stationary side permanent magnet row 36A and the N pole of the permanent magnet 35BB of the stationary side permanent magnet row 36B, respectively, as shown in FIG. 12A (that is, the moving side permanent magnet 21A laces the stationary side permanent magnets 35AA and 35BA each between their magnetic poles of same sign) to the state that the S and N poles of the permanent magnet 21A of the moving side permanent magnet row 22 on opposite sides face the N pole of a permanent magnet 35AC of the stationary side permanent magnet row 36A and the S pole of a permanent magnet 35BC of the stationary side permanent magnet row 36B, respectively, as shown in FIG. 12C (that is, the moving side permanent magnet 21A faces the stationary side permanent magnets 35AB and 35BB each between their magnetic poles of opposite sign) through the state of FIG. 12B. In this situation, magnetic attractive/repulsive forces act on the moving side permanent magnet 21A in an accelerating direction as shown by a broken line arrow Q in FIG. 12A. Since the permanent magnet 21A is held for sliding motion within the slot 61, this accelerating force acts only on the permanent magnet 21A and is not transmitted to the frame 59 or truck 55. More particularly, if the moving side permanent magnet 21A is slightly pushed by the restraint edge 63 of the slot 61 from the state of FIG. 12A wherein magnetic poles of same sign are aligned, magnetic repulsive forces between the magnetic poles of the moving side permanent magnet 21A and the stationary side permanent magnets 35AB and 35BB cause the moving side permanent magnet 21A to slide within the slot 61 forward relative to the frame 59 and thereafter, magnetic attractive forces between the magnetic poles of the moving side permanent magnet 21A and the stationary side permanent magnets 35AC and 35BC cause the moving side permanent magnet 21A to reach a position aligned with the stationary side permanent magnets 35AC and 35BC. This state is shown in FIG. 12B. Since the truck 55 and frame 59 continues to move forward for this duration, the restraint edge 63 of the slot 61 eventually comes in abutment with the moving side permanent magnet 21A as shown in FIG. 12C. In this way, when magnetic attractive/repulsive forces act on the moving side permanent magnet 21A in an accelerating direction, the moving side permanent magnet 21A is slid within the slot 61 relative to the frame 59 due to the magnetic attractive/repulsive forces so that the magnetic attractive/repulsive forces do not act on the frame 59 and truck 55 in an accelerating direction.

Figure 11B:
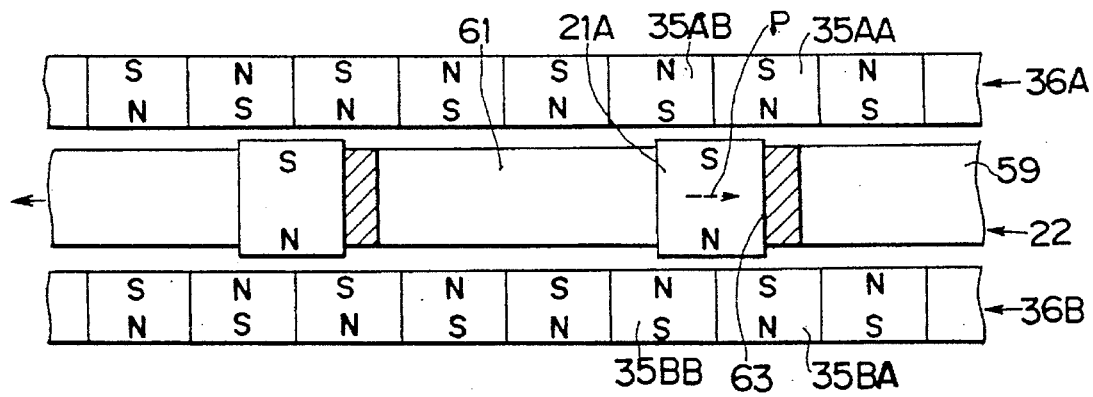
Figure 11C:
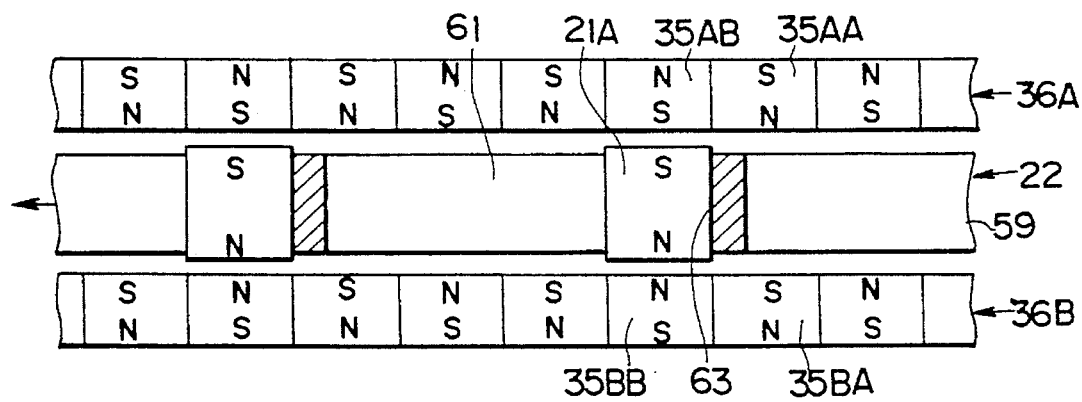

In this way, the transition state shown in FIGS. 11A to 11C and the transition state shown in FIGS. 12A to 12C are alternately repeated while a braking force is applied to the truck 55 only during the transition state shown in FIGS. 11A to 11C.

Figure 13:
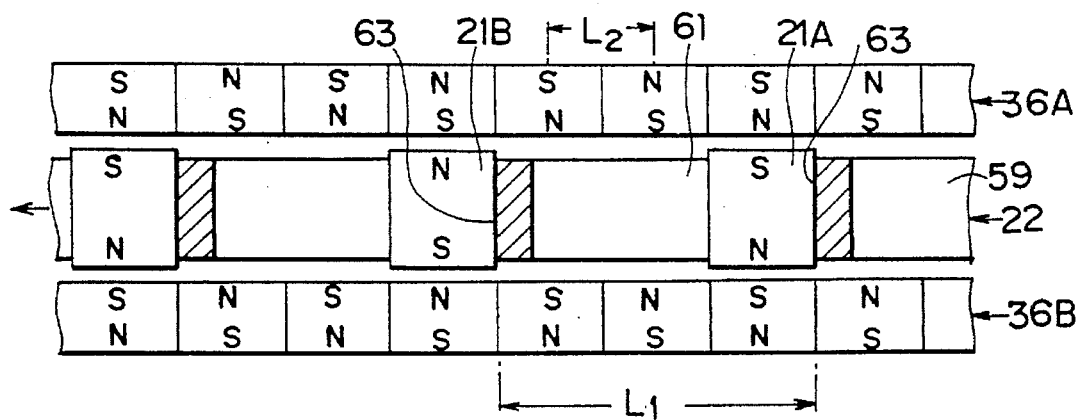
FIG. 13 illustrates a modification of the embodiment of FIG. 7 by showing the relationship between the moving and stationary side magnet rows.
Figure 14:
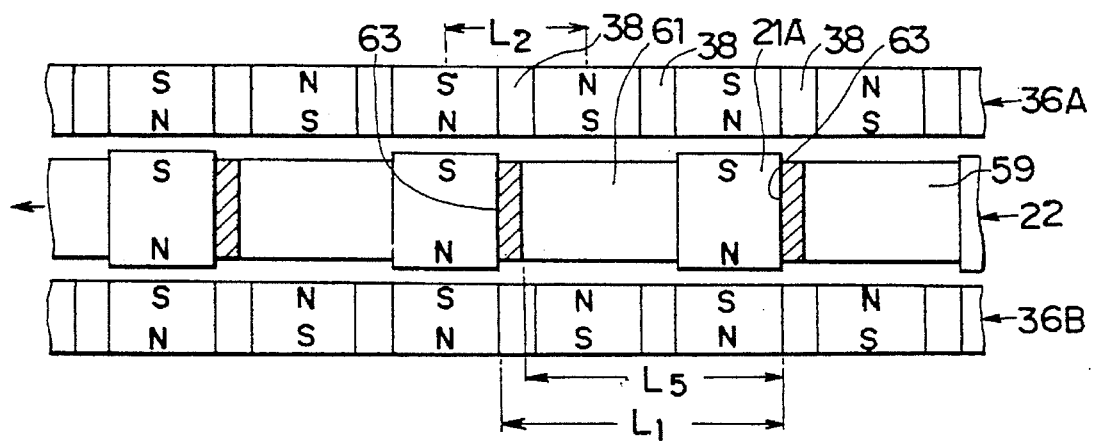
FIG. 14 illustrates another modification of the embodiment of FIG. 7 by showing the relationship between the moving and stationary side magnet rows.
Figure 15:
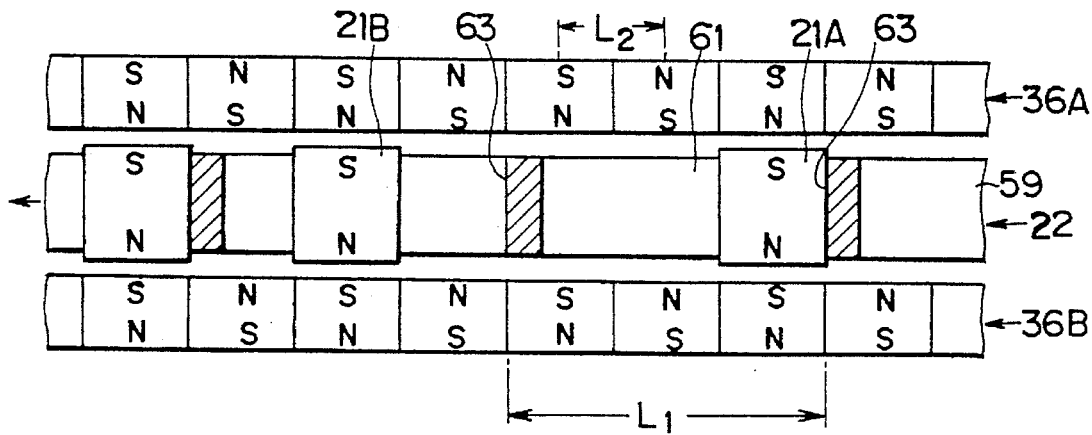
FIG. 15 illustrates a further modification of the embodiment of FIG. 7 by showing the relationship between the moving and stationary side magnet rows.
Figure 16:
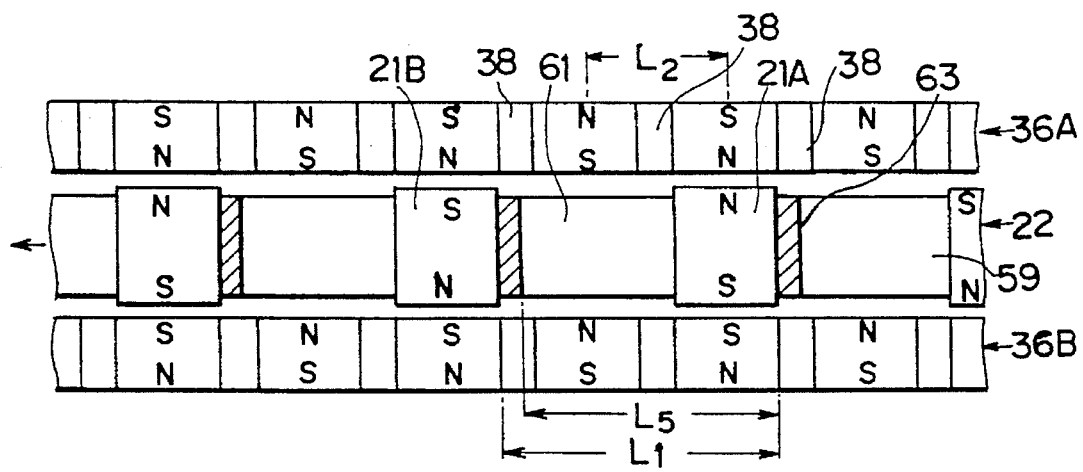
FIG. 16 illustrates a still further modification of the embodiment of FIG. 7 by showing the relationship between the moving and stationary side magnet rows.

In the embodiment shown in FIGS. 7 to 12C, the distance $L_1$ between the restraint edges 63 of a pair of adjoining slots 61 is four times the center-to-center distance $L_2$ between two adjoining magnetic poles in the stationary side permanent magnet rows 36A and 36B, that is, the stationary side includes four magnets 35 per one permanent magnet 21 on the moving side. The present invention is not limited to this embodiment. The distance $L_1$ between the restraint edges 63 of a pair of adjoining slots 61 may be at least two times the center-to-center distance $L_2$ between two adjoining magnetic poles in the stationary side permanent magnet rows 36A and 36B. For example, FIGS. 13 and 15 show the restraint edge distance $L_1$ greater than the magnetic pole center distance $L_2$ on the stationary side permanent magnet rows 36A and 36B by a factor of 3. FIGS. 14 and 16 show the restraint edge distance $L_1$ greater than the magnetic pole center distance $L_2$ on the stationary side permanent magnet rows 36A and 36B by a factor of 2.

It is to be noted that the slot 61 must have a length ($L_5$ in FIG. 14, for example) enough to allow the moving side permanent magnet 21 to slide from a position aligned with a pair of permanent magnets in the stationary side permanent magnet rows 36A and 36B to a next position aligned with an adjacent pair of permanent magnets. The embodiments of FIGS. 14 and 16 wherein spacers 38 are disposed between permanent magnets 35 in the stationary side permanent magnet rows 36A and 36B afford a sufficient length $L_5$ of the slot 61 (the slidable distance of the moving side permanent magnet) although the restraint edge distance $L_1$ is just two times the magnetic pole center distance $L_2$ on the stationary side permanent magnet rows 36A and 36B.

Moreover, when the distance $L_1$ between the restraint edges 63 of a pair of adjoining slots 61 is an even multiple of the center-to-center distance $L_2$ between two adjoining magnetic poles in the stationary side permanent magnet rows 36A and 36B and all the moving side permanent magnets 21 have the same orientation of their magnetic poles as in the embodiment of FIGS. 7 to 12C and the embodiment of FIG. 14, there appears a situation that when a certain moving side permanent magnet 21A is aligned with the corresponding permanent magnets in the stationary side permanent magnet rows 36A and 36B with magnetic poles of opposite sign faced each other, all the remaining moving side permanent magnets 21A are aligned with the corresponding permanent magnets in the stationary side permanent magnet rows 36A and 36B with magnetic poles of opposite sign faced each other. And when a certain moving side permanent magnet 21A is aligned with the corresponding permanent magnets in the stationary side permanent magnet rows 36A and 36B with magnetic poles of same sign faced each other, all the remaining moving side permanent magnets 21A are aligned with the corresponding permanent magnets in the stationary side permanent magnet rows 36A and 36B with magnetic poles of same sign faced each other. Therefore, in this embodiment, braking forces are simultaneously applied to the frame 59 via the moving side permanent magnets 21 at a certain instant, and no braking forces are applied at a subsequent instant (no accelerating forces are applied as previously described). As a whole, states having braking forces applied and states having no braking forces applied occur alternately.

On the other hand, when the distance $L_1$ between the restraint edges 63 of a pair of adjoining slots 61 is an even multiple of the center-to-center distance $L_2$ between two adjoining magnetic poles in the stationary side permanent magnet rows 36A and 36B and the magnetic poles of the moving side permanent magnets 21 are alternately oriented in the moving direction as in the embodiment of FIG. 16, there appears a situation that when a certain moving side permanent magnet 21A is aligned with the corresponding permanent magnets in the stationary side permanent magnet rows 36A and 36B with magnetic poles of same sign faced each other, an adjacent moving side permanent magnet 21B is aligned with the corresponding permanent magnets in the stationary side permanent magnet rows 36A and 36B with magnetic poles of opposite sign faced each other. And when a certain moving side permanent magnet 21A is aligned with the corresponding permanent magnets in the stationary side permanent magnet rows 36A and 36B with magnetic poles of opposite sign faced each other, an adjacent moving side permanent magnet 21B is aligned with the corresponding permanent magnets in the stationary side permanent magnet rows 36A and 36B with magnetic poles of same sign faced each other. Then in this embodiment, while a certain moving side permanent magnet 21A applies a braking force, the adjacent moving side permanent magnet 21B applies no braking force (the magnet 21B slides and applies no accelerating force too). Inversely, while the moving side permanent magnet 21B applies a braking force, the adjacent moving side permanent magnet 21A applies no braking force. Namely, in this embodiment, states wherein every two moving side permanent magnets (corresponding to magnet 21A) apply braking forces and states wherein every other two moving side permanent magnets (corresponding to magnet 21B) apply braking forces occur alternately. Accordingly braking forces are substantially continuously applied to the truck.

When the distance $L_1$ between the restraint edges 63 of a pair of adjoining slots 61 is an odd multiple of the center-to-center distance $L_2$ between two adjoining magnetic poles in the stationary side permanent magnet rows 36A and 36B, the situation is reversed from the foregoing embodiment using an even multiple. For example, in a case where the restraint edge distance $L_1$ is a three multiple of the magnetic pole center distance $L_2$ in the stationary side permanent magnet rows 36A and 36B, if the magnetic poles of the moving side permanent magnets 21 are alternately oriented in the moving direction as in the embodiment of FIG. 13, states wherein all the moving side permanent magnets 21 apply braking forces and states wherein all the moving side permanent magnets 21 apply no braking forces occur alternately. If all the moving side permanent magnets 21 have the same orientation of their magnetic poles, states wherein every two moving side permanent magnets corresponding to magnet 21A apply braking forces and states wherein other every two moving side permanent magnets corresponding to magnet 21B apply braking forces occur alternately.

Figure 17:
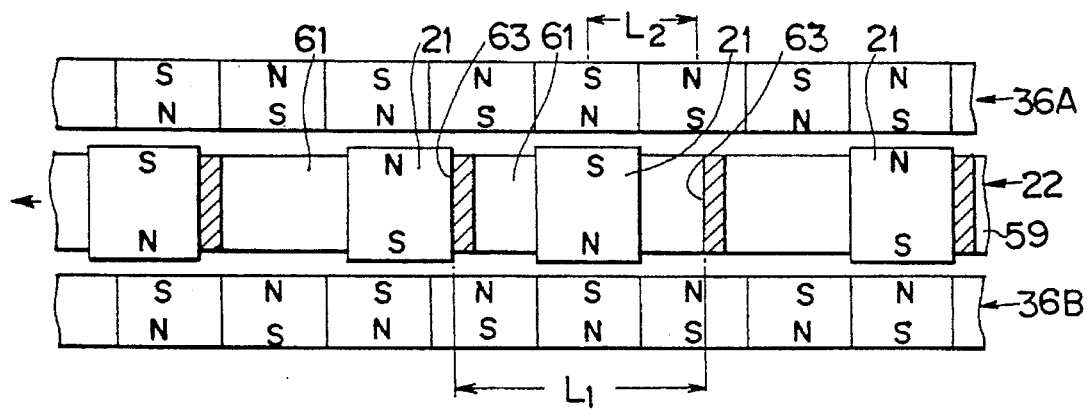
FIG. 17 illustrates a still further modification of the embodiment of FIG. 7 by showing the relationship between the moving and stationary side magnet rows.

The above-mentioned relationship can be further extended. The distance $L_1$ between the restraint edges 63 of a pair of adjoining slots 61 is more than two times and a non-integral multiple of the center-to-center distance $L_2$ between two adjoining magnetic poles in the stationary side permanent magnet rows 36A and 36B, for example, greater by a non-integral multiple of 2.1 or 2.3, the moving side permanent magnets 21 are aligned with the magnetic poles in the stationary side permanent magnet rows 36A and 36B at different points of time, and as a result, the moving side permanent magnets 21 apply braking forces at different points of time. That is, the timing of applying braking force is shifted among the magnets. As a result, the relationship of braking force to time is smoothed and braking forces are applied in a smooth manner. One exemplary arrangement of permanent magnets is illustrated in FIG. 17. In this embodiment, substantially equal results are obtained whether the orientation of magnetic poles of the moving side permanent magnets 21 is identical or alternately reversed in a moving direction.

In the embodiments of FIGS. 7 to 17, the moving and stationary sides are in an interchangeable relationship. It is then possible that permanent magnets are held for sliding motion on the stationary side and permanent magnets are fixedly held on the moving side. One exemplary arrangement is illustrated in FIG. 18 which otherwise corresponds to the embodiment of FIG. 17.

Figure 18:
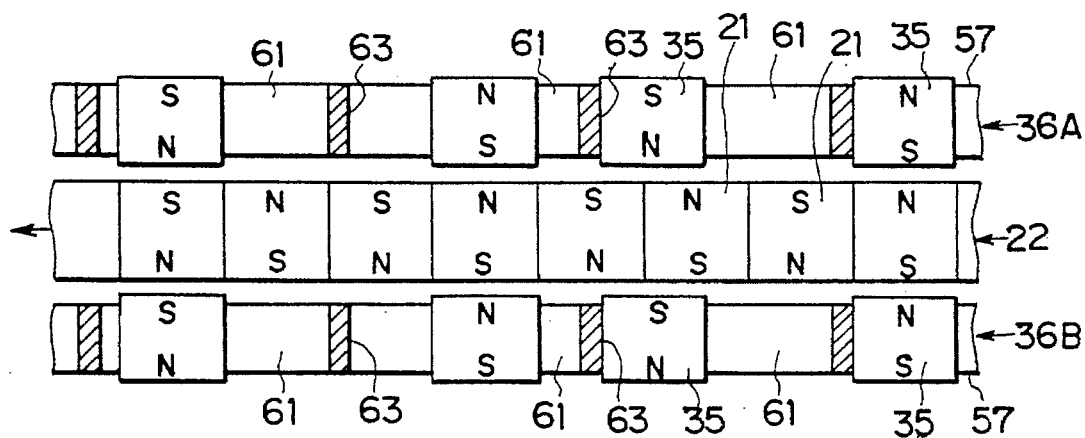
FIG. 18 illustrates a still further modification of the embodiment of FIG. 7 wherein the stationary side magnets are slidable by showing the relationship between the moving and stationary side magnet rows.

In FIG. 18, slots 61 are formed in a stationary base 57 (see FIG. 7) and have opposed edges. One of the edges which is located forward in the moving direction of the truck 55 forms a restraint edge 63. A stationary side permanent magnet 35 is fitted in each of the slots 61 for sliding motion. Two stationary side rows 36A and 36B include such arrangements of permanent magnets 35. The manner of mounting the stationary side permanent magnets 35 may be the same as that of the moving side permanent magnets shown in FIG. 9. A moving side row 22 includes a plurality of permanent magnets 21 which are fixedly secured to the frame 59 of the vehicle truck 55 (see FIG. 7).

In the embodiment of FIG. 18, braking forces are applied when the stationary side permanent magnets 35 are restrained from further movement by the forward restraint edges 63 of the slots 61. No accelerating forces are applied since the stationary side permanent magnets 35 escape by sliding along the slots 61 aft in the moving direction.

Of course, the embodiments of FIGS. 13 to 16 can be modified such that the stationary side permanent magnets 35 are slidable as in FIG. 18.

It will be understood that the clearance means for allowing the moving or stationary side permanent magnets to escape when magnetic attractive/repulsive forces act between the magnetic poles of the stationary and moving sides in an accelerating direction, such that the magnetic attractive/repulsive forces do not act on the vehicle truck 55 is not limited to the embodiments of FIGS. 7 to 17 wherein the permanent magnets are linearly slid in a direction along the moving direction of the truck 55. It suffices that the direction along which the moving or stationary side permanent magnets escape includes a component parallel to the moving direction of the truck 55. One alternative is a means for providing escape for the moving or stationary side permanent magnets by rotating or turning them. One exemplary arrangement is illustrated in FIGS. 19A to 19C.

Figure 19A:
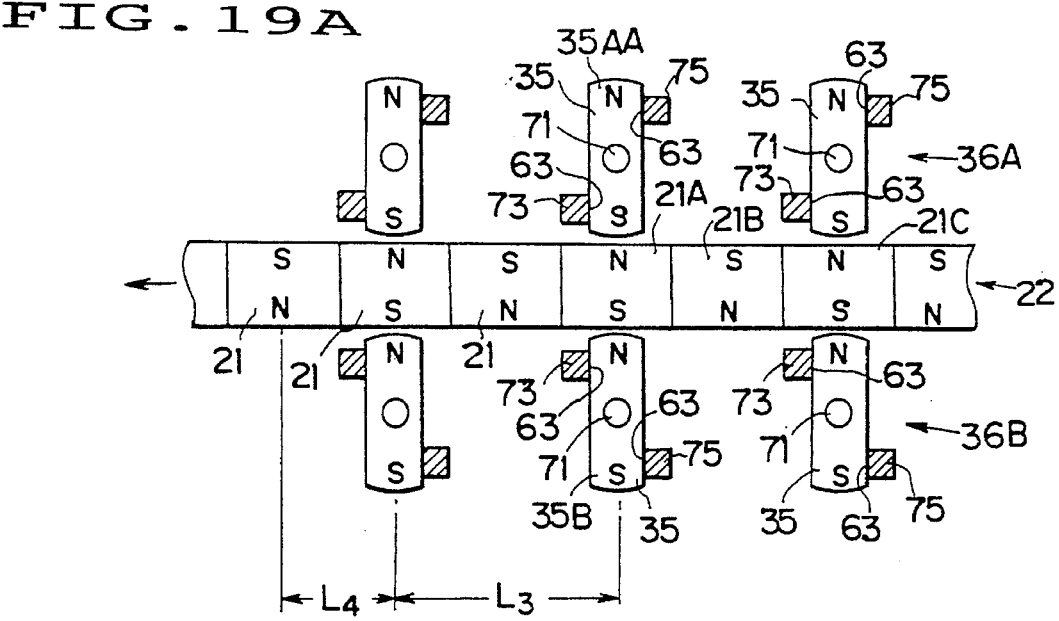
FIGS. 19A–19C illustrates a still further modification of the embodiment of FIG. 7 wherein the stationary side magnets are rotatable, showing the relationship between the moving and stationary side magnet rows at sequential stages for describing the operation of the brake.
Figure 19B:
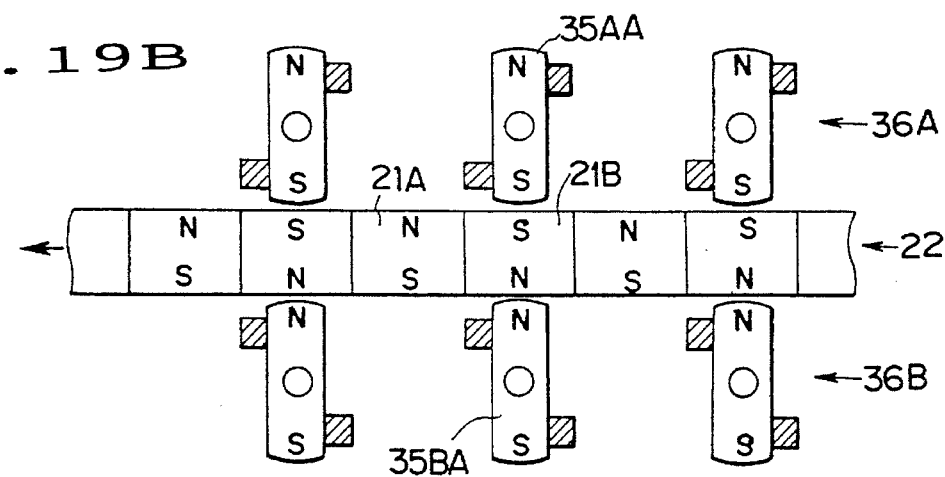
Figure 19C:
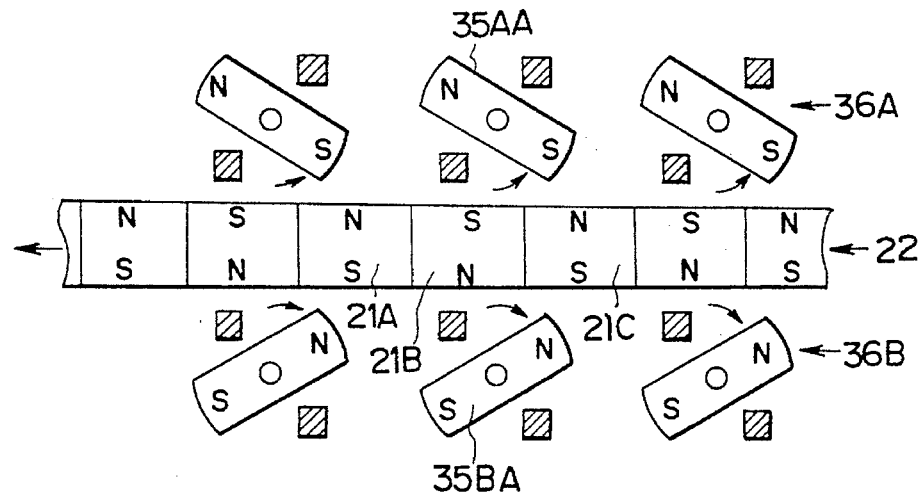

In the arrangement of FIGS. 19A to 19C, a moving side row 22 includes alternately arranged permanent magnets 21 which are fixedly secured to a frame 59 of a vehicle truck 55 (see FIG. 7). Two stationary side rows 36A and 36B include permanent magnets 35 which are mounted on vertical pivots 71 anchored to a stationary base 57 (see FIG. 7) such that the magnets 35 may rotate about the pivots 71 in a horizontal plane. Stops 73 and 75 are disposed on opposite sides of each stationary side permanent magnet 35 and symmetrically with respect to the pivot 71 and have restraint edges 63 for restraining one of the magnetic poles of the permanent magnet from rotating forward in the moving direction of the row 22 from the position directly facing the magnetic pole of a moving side permanent magnet 21.

The operation of the embodiment of FIGS. 19A to 19C is described below.

Assume that as shown in FIG. 19A, the moving side permanent magnet row 22 moves forward as shown by a solid arrow from the situation wherein each stationary side permanent magnet 35 is axially aligned with a moving side permanent magnet 21 in the row 22 in a transverse direction with their magnetic poles of opposite sign faced each other. First magnetic attractive forces act between stationary side permanent magnets 35AA and 35BA and a moving side permanent magnet 21A, for example, and then magnetic repulsive forces act between the stationary side permanent magnets 35AA and 35BA and the following moving side permanent magnet 21B. Although such magnetic attractive/repulsive forces cause the stationary side permanent magnets 35AA and 35BA to rotate clockwise and counter-clockwise in accordance with the moving direction of the moving side permanent magnet row 22, respectively, the magnets 35AA and 35BA cannot rotate in this direction because such rotation is restrained by the restraint edges 63 of the stops 73 and 75. As a result, the same magnetic attractive/repulsive forces act as a braking force on the moving side permanent magnet row 22. Next comes a situation as shown in FIG. 19B wherein each of stationary side permanent magnets 35AA and 35BA is axially aligned with a moving side permanent magnet 21B in the row 22 in a transverse direction with their magnetic poles of same sign faced each other. The moving side permanent magnet row 22 moves further forward from this situation to a situation as shown in FIG. 19C wherein magnetic repulsive forces act between the stationary side permanent magnets 35AA and 35BA and the moving side permanent magnet 21B to rotate the stationary side permanent magnets 35AA and 35BA aft in the moving direction (counter-clockwise and clockwise, respectively). The magnetic poles or tips of the stationary side permanent magnets 35AA and 35BA are moved apart from the moving side permanent magnet 21B. This avoids the same magnetic repulsive forces from acting as an accelerating force on the moving side permanent magnet row 22. Continuously the moving side permanent magnet row 22 moves further forward whereupon the stationary side permanent magnets 35AA and 35BA are rotated reversely in response to the advance of the moving side permanent magnet row 22 due to magnetic attractive forces acting between them and the moving side permanent magnet 21C, resuming the situation of FIG. 19A. At this point too, magnetic attractive forces act as forces for rotating and returning the stationary side permanent magnets 35AA and 35BA, but not as an accelerating force on the moving side permanent magnet row 22 and truck 55.

Although the stationary side permanent magnets 35 are rotatable in the embodiment of FIGS. 19A to 19C, it is possible that the stationary side permanent magnets 35 are fixed and the moving side permanent magnets 21 are rotatable because of the simple interchangeable relationship between the stationary and moving sides as previously mentioned. For example, tile arrangement of FIG. 19A is modified such that the permanent magnets designated at 21 are stationary side ones and the permanent magnets designated at 35 are moving side ones. Additionally, the positional relationship or correspondence between the stationary and moving side permanent magnets may also be modified as previously mentioned for the embodiments of FIGS. 7 to 18. For example, smoother braking force can be obtained by modifying the arrangement of FIG. 19A such that the distance $L_3$ between the pivotal centers of an adjacent pair of stationary side permanent magnets 35 (which is equal to the spacing between the restraint edges 63 on two adjacent stops) is more than two times and a non-integral multiple of the distance $L_4$ between the magnetic pole centers of two adjacent permanent magnets in the moving side permanent magnet row 22.

It will be understood that the embodiments of FIGS. 7 to 19C have referred to a vehicle truck as a typical example of the linearly moving member to be braked although the present invention is applicable to any other form of the linearly moving member.

The embodiments of FIGS. 7 to 19C are also applicable when the moving member is a rotational motion member. For example, a rotational motion member is provided with a plurality of slots extending circumferentially about the center of rotation of the member, and a moving side permanent magnet is held in each slot for sliding motion. Alternatively, a plurality of permanent magnets are held on a rotational motion member such that the permanent magnets may independently rotate about axes parallel to the center of rotation of the member, and a permanent magnet row on the stationary member includes permanent magnets fixedly arranged circumferentially about the center of rotation of the rotational motion member. Inversely, a stationary member is provided with a plurality of slots extending circumferentially about the center of rotation of a rotational member, and a permanent magnet is held in each slot for sliding motion. Alternatively, a plurality of permanent magnets are held on a stationary member such that the permanent magnets may independently rotate about axes parallel to the center of rotation of a rotational member, and a permanent magnet row on the rotational member includes permanent magnets fixedly arranged circumferentially about the center of rotation of the rotational member.

Figure 21:
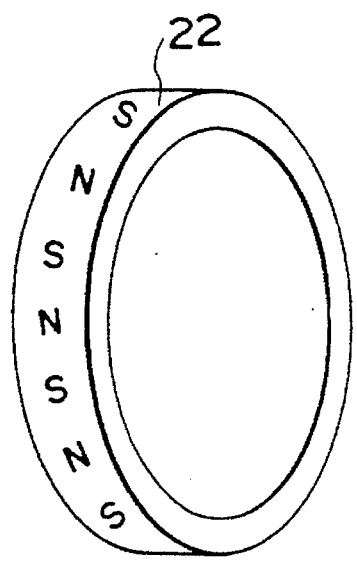
FIG. 21 is a perspective view of a moving side magnet row used in the brake of FIG. 20.
Figure 22:
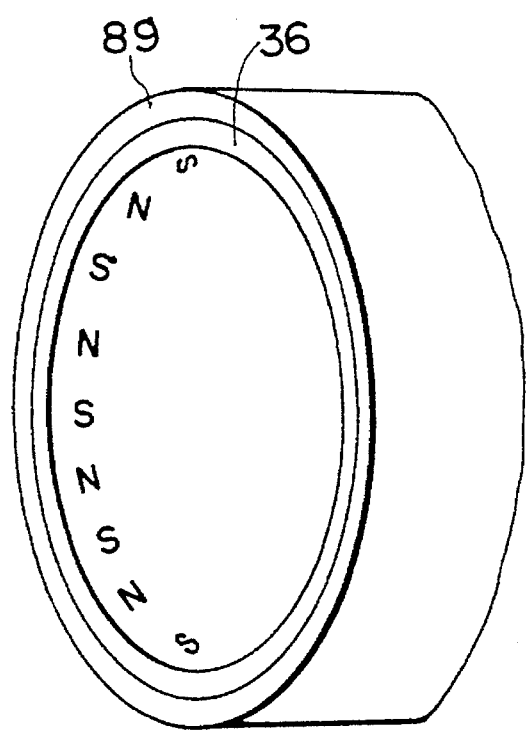
FIG. 22 is a perspective view of a stationary side magnet row used in the brake of FIG. 20.

A still further embodiment of the present invention is illustrated in FIGS. 20 to 22. Like the embodiment of FIGS. 1 to 4E, this embodiment includes a moving member which makes rotational motion and a unidirectional motion transmitting mechanism. This embodiment is different from that of FIGS. 1 to 4E in that it exerts a variable braking force.

In FIGS. 20 to 22, on a rotating shaft 5 coupled to a rotating member (not shown) as a moving member, a plurality of axially arranged support disks 83 are mounted through unidirectional roller clutches 81. A moving side permanent magnet row 22 in the form of a magnet ring is fitted around each support disk 83 at its outer perimeter. The moving side permanent magnet row 22 in the form of an alternately magnetized magnet ring is shown in FIG. 21 as a ring made of ferrite magnet or tile like which is magnetized at intervals so as to have magnetic poles of opposite sign (N and S) alternately arranged circumferentially on the outer perimeter. The moving side includes five rows of magnets in the illustrated embodiment. On the other hand, a linear guide in the form of a straight rail 87 rests on a stationary platform 85. A cup-shaped carriage 89 is mounted on the linear guide 87 such that the carriage 89 may slide in a longitudinal direction of the guide. A screw shaft 91 is mounted in a frame to extend in alignment with the rotating shaft 5 and at an aft end coupled to a rotational drive 93 such as a servo motor via a gear train 95. The screw shaft 91 is extended through the side wall of the carriage 89. Since the screw shaft 91 and the carriage 89 are in thread engagement, the carriage 89 can be moved back and forth in a direction parallel to the center axis of the rotating shaft 5 by actuating the drive 95 to rotate the screw shaft 91 via the gears 95. The carriage 89 is configured as a closed end hollow cylinder having a center axis aligned with the rotating shaft 5. A stationary side permanent magnet row 36 in the form of a magnet ring is fitted in the inner surface of the cylinder 89. The stationary side permanent magnet row 36 in the form of an alternately magnetized magnet ring is shown in FIG. 22 as a ring made of ferrite magnet or the like which is magnetized at intervals so as to have magnetic poles of opposite sign (N and S) alternately arranged circumferentially on the inner surface. The magnet ring or stationary side permanent magnet row 36 has an inner diameter which is slightly larger than the outer diameter of the magnet ring or moving side permanent magnet row 22.

In the embodiment of FIGS. 20 to 22, when the carriage 89 is retracted, that is, when the annular stationary side permanent magnet row 36 does not surround the annular moving side permanent magnet rows 22, no substantial magnetic interaction occurs between the rows 36 and 22. At this point, the rotating member is allowed for free rotation since no braking force is applied to the row 22 and rotating shaft 5.

Now the rotational drive 93 is actuated to rotate the screw shaft 91 to move forward the carriage 89 until the annular stationary side permanent magnet row 36 at the inner surface surrounds the annular moving side permanent magnet rows 22 at the outer surface. By controlling the protruding distance of the carriage 89, the number of moving side permanent magnet rows 22 that are surrounded by the annular stationary side permanent magnet row 36 can be varied. Between the annular stationary side permanent magnet row 36 and the moving side permanent magnet rows 22 enclosed therein, magnetic attractive and repulsive forces are sequentially exerted with rotation of the moving side permanent magnet rows 22 in the same manner as described for the embodiment of FIGS. 1 to 4E. States of magnetic attractive/repulsive forces acting to decelerate the moving side permanent magnet rows 22 and states of magnetic attractive/repulsive forces acting to accelerate the moving side permanent magnet rows 22 occur in an alternate fashion. In the states of magnetic attractive/repulsive forces acting in a decelerating direction, the decelerating forces (that is, braking forces) are transmitted to the rotating shaft 5 by the unidirectional motion transmitting function of the unidirectional roller clutch 81, thereby applying a braking force to the rotating member. On the other hand, in the states of magnetic attractive/repulsive forces acting in an accelerating direction, the accelerating forces are not transmitted to the rotating shaft 5. As a result, only braking force acts on the rotating member in total. It will be understood that as the number of moving side permanent magnet rows 22 that are surrounded by the annular stationary side permanent magnet row 36 increases, the magnetic attractive/repulsive forces increase and a greater braking force is applied to the rotating member. Accordingly the braking force can be adjusted by controlling the projection of the carriage 89.

Although the braking force has been described as varying in terms of the number of moving side permanent magnet rows 22 that are surrounded by the annular stationary side permanent magnet row 36, the braking force can also be finely adjusted in terms of the overlapping surface area between the moving side permanent magnet rows 22 and the stationary side permanent magnet row 36 which also changes with the extent of projection of the carriage 89.

In the embodiment of FIGS. 20 to 22 wherein a plurality of annular moving side permanent magnet rows 22 are independently mounted on the rotating shaft 5 through unidirectional roller clutches 81, if magnetic poles are phase shifted among the respective moving side permanent magnet rows 22, that is, if magnetic pole centers are offset among the respective rows 22, braking forces are applied to the respective moving side permanent magnet rows 22 at different points of time. As a result, smooth braking forces are applied in total.

It is, of course, possible that a plurality of annular moving side permanent magnet rows be replaced by a single wide annular moving side permanent magnet row. Also in this case, braking force can be adjusted by controlling the projection of tile carriage 89 to alter the overlapping area between the stationary and moving side permanent magnets.

Although the moving side permanent magnet rows 22 on their outer periphery are enclosed by the stationary side permanent magnet row 36 in the embodiment of FIG. 20, it is possible that the stationary side permanent magnet row on their outer periphery are enclosed by the moving side permanent magnet row by using the alternately magnetized annular permanent magnet shown in FIG. 21 as a stationary side permanent magnet row and the alternately magnetized annular permanent magnet shown in FIG. 22 as a moving side permanent magnet row.

Although the unidirectional roller clutch 81 forms a unidirectional motion transmitting mechanism in the embodiment of FIGS. 20 to 22, a ratchet-pawl combination as shown in the embodiment of FIGS. 1 to 4E may be used instead of the clutch. A further modification of the embodiment of FIGS. 20 to 22 is possible. FOR example, the moving side permanent magnet row is fixedly secured to the moving member and the stationary side permanent magnet row is held for unidirectional rotation to the stationary member through a unidirectional clutch or ratchet-pawl engagement.

In the foregoing embodiments, all the stationary and moving side magnet rows consist of permanent magnets. It will be understood that the stationary side magnet row may consist of electromagnets if desired.

The brake apparatus of the invention applies a braking force to a moving member by utilizing magnetic attractive/repulsive forces between moving and stationary side magnets. The kinetic energy of the moving member is dissipated as molecular energy by internal deformation of the stationary side magnets, stationary member, and members supporting them, and at least a portion of this molecular energy is dissipated as heat energy. Since this heat energy on release is dispersed over a very wide area or many components, the quantity of heat energy dissipated per unit area is small enough to minimize the risk of local temperature rise. There is little likelihood of heating the components hot. Therefore the components can be made of low cost, less heat resistant materials and remain durable. There is no need for an extra cooling device or heat sink or heat radiating fins. Thermal influence to the ambient atmosphere is minimal.

Although some preferred embodiments have been described, many modifications and variations may be made thereto in tile light of the above teachings. It is therefore to be understood that within the scope of the appended claims, the invention may be practiced otherwise than as specifically described.

I claim:

1. A brake apparatus applying a braking force from a stationary member to a moving member adapted to move along a predetermined orbit relative to the stationary member wherein said stationary member carries thereon a row of at east one magnet such that a plurality of magnetic poles are arranged along the orbit of said moving member, said moving member carries thereon a row of at least one permanent magnet such that a plurality of magnetic poles are arranged along the orbit of said moving member and such that the plurality of magnetic poles face the magnetic poles of the magnet row on said stationary member when said moving member moves, at least one magnet row of the magnet row on said stationary member and the magnet row on said moving member, on its side facing the other magnet row, has magnetic poles of opposite sign alternately arranged in the direction of said orbit, either one magnet row of the magnet row on said stationary member and the magnet row on said moving member is fixedly secured to the member carrying it, and the other magnet row or each magnet therein is coupled to the member carrying it through a selective interlocking means such that when a magnetic attractive force and a magnetic repulsive force between the magnetic poles of the other magnet row and the magnetic poles of the one magnet row acts in a direction to accelerate motion of said moving member, said other magnet row or each magnet is allowed for movement relative to the member carrying it in a direction including the direction of the magnetic attractive force and magnetic repulsive force acting, and when a magnetic attractive force and a magnetic repulsive force between the magnetic poles of the other magnet row and the magnetic poles of the one magnet row acts in a direction to decelerate motion of said moving member, said other magnet row or each magnet is restrained from movement relative to the member carrying it in a direction including the direction of the magnetic attractive force and magnetic repulsive force acting.

2. A brake apparatus according to claim 1 wherein said selective interlocking means includes a unidirectional motion transmitting mechanism interposed between said other magnet row and the member carrying it.

3. A brake apparatus according to claim 1 wherein said selective interlocking means has each magnet of the other magnet row held such that each magnet is individually movable and includes a restraint edge Lot restraining movement of each magnet such that each magnet cannot move beyond a predetermined position.

4. A brake apparatus according to claim 1 wherein the magnet row on said stationary member includes a plurality of permanent magnets.

5. A brake apparatus according to claim 1 wherein the magnet row off said stationary member includes a plurality of electromagnets.

6. A brake apparatus according to claim i wherein said moving men,bet is rotatable about a predetermined axis of rotation.

7. A brake apparatus according to claim 6 wherein said moving member carries thereon a row of magnets arranged circumferentially about the axis of rotation thereof, said stationary member carries thereon a row of magnets arranged circumferentially about the axis of rotation of said moving member, and said stationary member is translatable parallel to the axis of rotation of said moving member between an on position where the magnet row on the stationary member and the permanent magnet row on the moving member are close enough to provide magnetic interaction and an off position where the magnet row on the stationary member and the permanent magnet row on the moving member are spaced apart.

8. A brake apparatus according to claim 6 wherein the magnet row on the stationary member faces the magnet row on the moving member in a plane perpendicular to the axis of rotation of said moving mender.

9. A brake apparatus according to claim 6 wherein the magnet row on the stationary member faces the magnet row on the moving member in a cylindrical surface about the axis of rotation of said moving member.

10. A brake apparatus according to claim 6 wherein each of the magnet row on the stationary member and the magnet row on the moving member includes a plurality of magnets disposed such that magnetic poles of opposite sign are alternately arranged in the rotational direction of said moving mender.

11. A brake apparatus according to claim 6 wherein either one of the magnet row on the stationary member and the magnet row on the moving member includes a plurality of magnets disposed such that magnetic poles of opposite sign are alternately arranged in the rotational direction of said moving member, and the other magnet row includes a plurality of magnets disposed such that only magnetic poles of identical sign are arranged on a side facing said one magnet row and at such a spacing that the magnetic poles ace every two magnetic poles in said one magnet row.

12. A brake apparatus according to claim 6 wherein said selective interlocking means includes a unidirectional rotation transmitting mechanism interposed between said other magnet row and the member carrying it.

13. A brake apparatus according to claim 1 wherein said moving member is linearly translatable along a predetermined straight line.

14. A brake apparatus according to claim 13 wherein the magnets in said one magnet row are fixedly secured to the member carrying them along said straight line, the magnets in said other magnet row are mounted to the member carrying them for limited sliding motion over a predetermined distance along said straight line, the slidable mount constituting said selective interlocking means.

15. A brake apparatus according to claim 13 wherein the magnets in said one magnet row are fixedly secured to the member carrying them along said straight line, the magnets in said other magnet row are mounted to the member carrying them for limited angular rotation in a plane containing said straight line, the rotatable mount constituting said selective interlocking means.

* * * * *